US009367357B2

(12) United States Patent
Cadambi et al.

(10) Patent No.: US 9,367,357 B2
(45) Date of Patent: Jun. 14, 2016

(54) SIMULTANEOUS SCHEDULING OF PROCESSES AND OFFLOADING COMPUTATION ON MANY-CORE COPROCESSORS

(71) Applicant: NEC Laboratories America, Inc., Princeton, NJ (US)

(72) Inventors: Srihari Cadambi, Princeton Junction, NJ (US); Kunal Rao, Princeton, NJ (US); Srimat Chakradhar, Manalapan, NJ (US); Rajat Phull, Redmond, WA (US); Giuseppe Coviello, Plainsboro, NJ (US); Murugan Sankaradass, Dayton, NJ (US); Cheng-Hong Li, New Brunswick, NJ (US)

(73) Assignee: NEC Corporation (JP)

( * ) Notice: Subject to any disclaimer, the term of this patent is extended or adjusted under 35 U.S.C. 154(b) by 225 days.

(21) Appl. No.: 14/261,090

(22) Filed: Apr. 24, 2014

(65) Prior Publication Data
US 2014/0237477 A1    Aug. 21, 2014

Related U.S. Application Data

(63) Continuation-in-part of application No. 13/858,039, filed on Apr. 6, 2013, now Pat. No. 9,152,467.

(60) Provisional application No. 61/816,053, filed on Apr. 25, 2013, provisional application No. 61/754,371, filed on Jan. 18, 2013, provisional application No. 61/761,985, filed on Feb. 7, 2013, provisional application No. 61/761,969, filed on Feb. 7, 2013.

(51) Int. Cl.
*G06F 9/46* (2006.01)
*G06F 9/50* (2006.01)
*G06F 9/48* (2006.01)

(52) U.S. Cl.
CPC ............ *G06F 9/5044* (2013.01); *G06F 9/4881* (2013.01)

(58) Field of Classification Search
None
See application file for complete search history.

(56) References Cited

U.S. PATENT DOCUMENTS

| 7,369,500 B1 * | 5/2008 | Gallagher | H04L 45/60 370/235 |
| 8,024,395 B1 * | 9/2011 | Odom | G06F 9/5072 709/201 |

(Continued)

OTHER PUBLICATIONS

Smith, B., et al. "Operating System Resource Management" BSC Microsoft Research Centre Presentation. Sep. 2010. (20 Pages).

(Continued)

*Primary Examiner* — Emerson Puente
*Assistant Examiner* — Mehran Kamran
(74) *Attorney, Agent, or Firm* — Joseph Kolodka

(57) ABSTRACT

Methods and systems for scheduling jobs to manycore nodes in a cluster include selecting a job to run according to the job's wait time and the job's expected execution time; sending job requirements to all nodes in a cluster, where each node includes a manycore processor; determining at each node whether said node has sufficient resources to ever satisfy the job requirements and, if no node has sufficient resources, deleting the job; creating a list of nodes that have sufficient free resources at a present time to satisfy the job requirements; and assigning the job to a node, based on a difference between an expected execution time and associated confidence value for each node and a hypothetical fastest execution time and associated hypothetical maximum confidence value.

13 Claims, 18 Drawing Sheets

(56) References Cited

U.S. PATENT DOCUMENTS

| | | | | |
|---|---|---|---|---|
| 8,312,037 B1* | 11/2012 | Bacthavachalu | G06F 9/5066 | 707/769 |
| 8,412,822 B1* | 4/2013 | Weinman, Jr. | G06F 9/5027 | 709/201 |
| 8,484,279 B1* | 7/2013 | Cole | G06F 9/5044 | 709/201 |
| 8,719,415 B1* | 5/2014 | Sirota | G06F 9/5061 | 709/221 |
| 8,826,280 B1* | 9/2014 | Robertson | G06Q 10/103 | 718/100 |
| 8,990,200 B1* | 3/2015 | Christensen | G06F 17/30528 | 707/723 |
| 2002/0194248 A1* | 12/2002 | Wood | G06F 9/5038 | 718/102 |
| 2004/0111725 A1* | 6/2004 | Srinivasan | G06F 9/4856 | 718/105 |
| 2005/0235248 A1* | 10/2005 | Victoria | G06F 8/73 | 717/102 |
| 2005/0262506 A1* | 11/2005 | Dawson | G06F 9/5072 | 718/100 |
| 2005/0283786 A1* | 12/2005 | Dettinger | G06Q 10/10 | 718/104 |
| 2006/0167966 A1* | 7/2006 | Kumar | G06F 9/5038 | 709/201 |
| 2006/0218551 A1* | 9/2006 | Berstis | G06F 9/4881 | 718/102 |
| 2007/0011683 A1* | 1/2007 | Helander | G06F 9/4887 | 718/104 |
| 2007/0192261 A1* | 8/2007 | Kelkar | G06F 9/50 | 706/1 |
| 2007/0197197 A1* | 8/2007 | Minear | G06F 21/10 | 455/414.1 |
| 2008/0021987 A1* | 1/2008 | Bates | G06F 9/5044 | 709/223 |
| 2008/0046895 A1* | 2/2008 | Dillenberger | G06F 9/505 | 718/105 |
| 2008/0183311 A1* | 7/2008 | MacArthur | G05B 17/02 | 700/29 |
| 2008/0195843 A1* | 8/2008 | Muniandy | G06T 15/08 | 712/31 |
| 2008/0263324 A1* | 10/2008 | Sutardja | G06F 1/3203 | 712/43 |
| 2008/0307426 A1* | 12/2008 | Toeroe | G06F 9/5044 | 718/104 |
| 2008/0320482 A1* | 12/2008 | Dawson | G06F 9/5027 | 718/104 |
| 2009/0055829 A1* | 2/2009 | Gibson | G06F 9/4881 | 718/103 |
| 2009/0077235 A1* | 3/2009 | Podila | G06F 9/5044 | 709/226 |
| 2010/0292980 A1* | 11/2010 | Andrade | H04L 41/5035 | 703/22 |
| 2010/0306780 A1* | 12/2010 | Mikamo | G06F 9/505 | 718/104 |
| 2011/0119469 A1* | 5/2011 | Ohmacht | G06F 9/3004 | 712/216 |
| 2011/0239220 A1* | 9/2011 | Gibson | G06F 1/3206 | 718/103 |
| 2012/0054771 A1* | 3/2012 | Krishnamurthy | G06F 9/4881 | 718/105 |
| 2012/0096466 A1* | 4/2012 | Sun | G06F 9/4881 | 718/102 |
| 2012/0110581 A1* | 5/2012 | Watson | G06F 9/485 | 718/100 |
| 2012/0117298 A1* | 5/2012 | Scannell | G06F 12/08 | 711/6 |
| 2012/0131591 A1* | 5/2012 | Moorthi | G06Q 30/00 | 718/104 |
| 2012/0159507 A1* | 6/2012 | Kwon | G06F 9/5088 | 718/104 |
| 2012/0185864 A1* | 7/2012 | Toukmaji | G06F 9/4881 | 718/104 |
| 2013/0194271 A1* | 8/2013 | Roesch | G06T 11/20 | 345/440 |
| 2013/0205141 A1* | 8/2013 | Solihin | G06F 1/3225 | 713/300 |
| 2013/0219407 A1* | 8/2013 | Weinman, Jr. | G06F 9/5027 | 718/105 |
| 2013/0346986 A1* | 12/2013 | Goetz | G06F 9/485 | 718/102 |
| 2014/0068621 A1* | 3/2014 | Sitaraman | G06F 9/505 | 718/102 |
| 2015/0135185 A1* | 5/2015 | Sirota | G06F 9/5061 | 718/103 |

OTHER PUBLICATIONS

Doulamis, N., et al. "Fair Scheduling Algorithms in Grids" IEEE Transactions on Parallel and Distributed Systems, vol. 18, No. 11. Nov. 2011. pp. 1630-1648.

Isard, M., et al. "Quincy: Fair Scheduling for Distributed Computing Clusters" Proceedings of the 22nd ACM Symposium on Operating Systems Principles. Oct. 2009. pp. 1-20.

Zaharia, M., et al. "Delay Scheduling: A Simple Technique for Achieving Locality and Fairness in Cluster Scheduling" European Conference on Computer Systems, Proceedings of the 5th European conference on Computer systems. Apr. 2010. (14 Pages).

* cited by examiner

```
while (new event) {
    if (there is a process to be scheduled) {
        /* Process scheduler: schedule a process from Process List */
        schedule(Process List,
                 fit(Memory Resource Limit),
                 urgency(priority, age, arrival time, credit, QoS));
    }
    for each Manycore Coprocessor {
        if (there is an offload to be scheduled) {
            /* Offload scheduler: schedule an offload from Offload List */
            schedule(Offload List,
                     fit(Thread Resource Limit),
                     urgency(priority, age, arrival time, credit, QoS));
        }
    }
    for each Completed Offload
        adjustCredits(owning process, actual execution time, QoS);
}
```

FIG. 5A

SIMULTANEOUS SCHEDULING OF PROCESSES AND OFFLOADING COMPUTATION ON MANY-CORE COPROCESSORS

RELATED APPLICATION INFORMATION

This application claims priority to provisional application Ser. No. 61/754,371 filed on Jan. 18, 2013, Ser. No. 61/761,969 filed on Feb. 7, 2013, Ser. No. 61/761,985 filed Feb. 7, 2013, and Ser. No. 61/816,053 filed on Apr. 25, 2013, all incorporated herein by reference. The application is a continuation-in-part of application Ser. No. 13/858,039, filed Apr. 6, 2013, incorporated herein by reference.

BACKGROUND

1. Technical Field

The present invention relates to multi-core processing and, more particularly, to scheduling in manycore processors.

2. Description of the Related Art

New manycore processors are devices with more than 50 processing cores supporting more than 200 hardware threads. In particular, and unlike the GPU and other manycore designs, The Intel® Xeon Phi™ includes several design choices that make the Xeon Phi™ easier to program. First, its cores are x86 compatible. Second, it runs the Linux operating system, enabling easy multiprocessing with services such as virtual memory and context switching. Third, it supports OpenMP, a popular parallel programming model. Intel® also provides middleware to manage data transfers between the host and coprocessor. Consequently, the Xeon Phi™ is widely perceived to be more usable across a range of parallel applications, especially when compared to other manycore offerings in the recent past.

Many suitable applications for the Xeon Phi™ can be expressed using a bag-of-tasks framework. Bag-of-tasks applications are those whose tasks are completely independent. Although conceptually simple, this framework is typical of a large class of problems such as satellite imaging, Berkely Open Infrastructure for Network Computing (BOINC)-like computations, image processing, networking, and others. Tasks belonging to bag-of-tasks applications typically have real-time constraints, which we refer to as the task deadline. For example, a satellite may produce a certain amount of data periodically, say once each revolution; to avoid backlog, the system must complete processing the data before the satellite comes around again and dumps the next round of data. Therefore, in the bag-of-task application scenarios, one requirement is to complete the processing of a task before its deadline.

SUMMARY

A method for scheduling jobs to manycore nodes in a cluster includes selecting a job to run according to the job's wait time and the job's expected execution time; sending job requirements to all nodes in a cluster, wherein each node comprises a manycore processor; determining at each node whether said node has sufficient resources to ever satisfy the job requirements and, if no node has sufficient resources, deleting the job; creating a list of nodes that have sufficient free resources at a present time to satisfy the job requirements; and assigning the job to a node using a processor, based on a difference between an expected execution time and associated confidence value for each node and a hypothetical fastest execution time and associated hypothetical maximum confidence value.

A system for scheduling jobs to manycore nodes in a cluster includes a scheduler comprising a processor configured to select a job to run according to the job's wait time and the job's expected execution time, to determine whether any node has sufficient resources to ever satisfy job requirements associated with the job and, if no node has sufficient resources, to delete the job, to create a list of nodes that have sufficient free resources at a present time to satisfy the job requirements, and to assign the job to a node using a processor, said assignment being based on a difference between an expected execution time and associated confidence value for each node and a hypothetical fastest execution time and associated hypothetical maximum confidence value.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5A-5H show exemplary scheduling procedures for the system of FIG. 1A;

DETAILED DESCRIPTION OF PREFERRED EMBODIMENTS

Figure 1A:
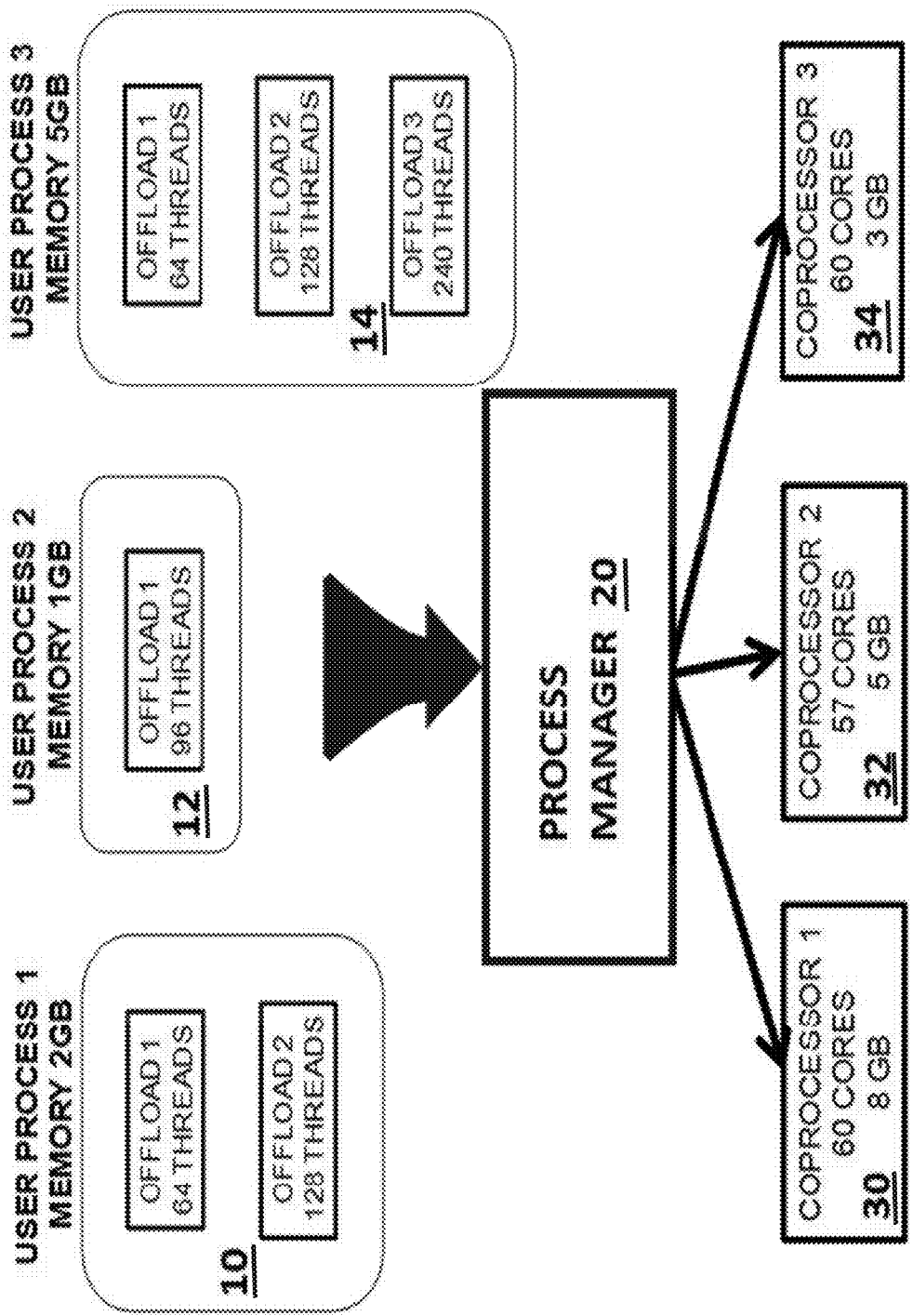
FIG. 1A shows an exemplary process manager for a multiprocessor system.

Referring now to FIG. 1A, a high-level view of a process manager 20 called the COSMIC system is shown. In a server with multiple coprocessors 30, 32, and 34, such as the Intel Xeon Phi™, each with different amounts of memory and cores, COSMIC manages offloads from several user processes 10, 12, and 14 to the manycore processors. Each user process contains several offload blocks that are executed sequentially. The process has a single memory requirement for all its offloads, while the offloads themselves have their own thread requirements. Thus, before execution, every process requests the process manager 20 for memory, and every offload requests the process manager 20 for threads. COSMIC arbitrates the requests by taking into consideration the different available coprocessors, the available cores within each device and the available memory. It then schedules and allocates resources for the offloads in such a way that thread and memory oversubscription are avoided, and the devices as well as the cores within them are load balanced. COSMIC manages processes and coprocessor resources to achieve the following:

Avoid over-subscribing coprocessor hardware threads.

Avoid over-subscribing and carefully manage the limited coprocessor main memory.

Map threads to cores, ensuring minimal thread migration, while reporting data affinity and persistence across offload regions.

Load balance applications across multiple coprocessors while ensuring locality of data.

Given a server populated with multiple integrated cores, such as the Xeon Phi™ coprocessors, with several users and processes competing for coprocessor resources, the goals of the process manager 20 are to manage processes and coprocessor resources and pursue the above-listed goals.

To simplify memory management, one implementation requests that the programmer specify the maximum memory required on the Xeon Phi™ for each process. This is similar to job submission requirements in cluster schedulers. In typical cases, different offloads of the same process often share data in order to reduce data movement between the host and Xeon Phi. Thus, as long as the process exists, it will use memory on the card. However, unlike cluster schedulers, this embodiment does not require the process specify core, devices or other resources, but infers it automatically from the number of threads requested by the offload. Unlike memory that is reserved for the life of a process, threads (and cores) are given to an offload when it starts executing and released when the offload completes for use by other offloads.

Before execution, every process requests COSMIC for memory, and every offload requests COSMIC for threads. COSMIC arbitrates the requests by taking into consideration the different available coprocessors, the available cores within each device, and the available memory. It then schedules and allocates resources for the offloads in such a way that thread and memory oversubscription are avoided, and the devices as well as the cores within them are load balanced.

COSMIC has several parameters that may be set by the server administrator or user that can affect its policies and behavior. An administrator can configure the following parameters of COSMIC to affect its scheduling decisions:

Aging threshold: how many times the scheduler attempts a process or offload before progress is blocked.

Thread factor $T_0$ (1 or larger): the offload "fit" function considers $T_0$ hardware threads as the total number of threads in a coprocessor. If $T_0$ is greater than 1, the number of threads is oversubscribed in a measured way to leverage the fact that slight oversubscription may sometimes be beneficial, as offloads might otherwise need to wait longer.

Memory factor $M_0$ (1 or larger): the process "Fit" function considers $M_0$ as the total physical memory of the coprocessor. If $M_0$ is greater than 1, then the memory is oversubscribed in a measured way to leverage the fact that not all processes will need their maximum requested memory at the same time.

COSMIC also expects from the owner of each process the following directives:

Memory limit: the peak memory the process will use over its lifetime. COSMIC kills any process that exceeds its memory usage as described later in this section.

Preferred thread affinity: to allocate Xeon Phi cores for an offload, COSMIC needs to know how user threads must be mapped to cores. A SCATTER mapping indicates 1 thread per core, a COMPACT mapping indicates 4 threads per core, and BALANCED indicates 3 threads per core.

User specifies maximum amount of memory per process, and use of host. The user sets the environment variables COSMIC_PROCESS_MAX_MEMORY and COSMIC_MIC_ONLY.

An administrator sets the following parameters:

An aging threshold. A scheduler chooses to skip (i.e., not schedule) a process or offload at the head of the queue if currently available resources are inadequate. However, a process or offload can be skipped at most "aging threshold" number of times. After that, the scheduler must schedule the process or offload to ensure fairness. If enough resources are not available, then the scheduler waits until adequate resources become available.

Ram fraction to use: $R_f$. Certain portions of RAM that are reserved for use by the OS, such as in daemon processes. $R_f$ is the fraction of physical ram that the scheduler assumes is available for applications.

Swap fraction to use: $S_f$. The scheduler uses $R_f*$(physical memory)+$S_f*$(swap space) as the available memory.

Memory over-scheduling $M_0$. The scheduler uses $M_0*$($R_f*$(physical memory)+$S_f*$(swap space)) as a memory resource limit. This parameter can be tuned to increase concurrency by leveraging the fact that all resident processes will not simultaneously use their maximum requested memory. For example, a process may end before another process has reached its peak memory usage.

Thread over-scheduling: $T_0$. The scheduler uses $T_0*4*$(number of cores) as the thread resource limit per processor, where each core has four hardware threads.

Enable use of host when scheduling a process.

Figure 1B:
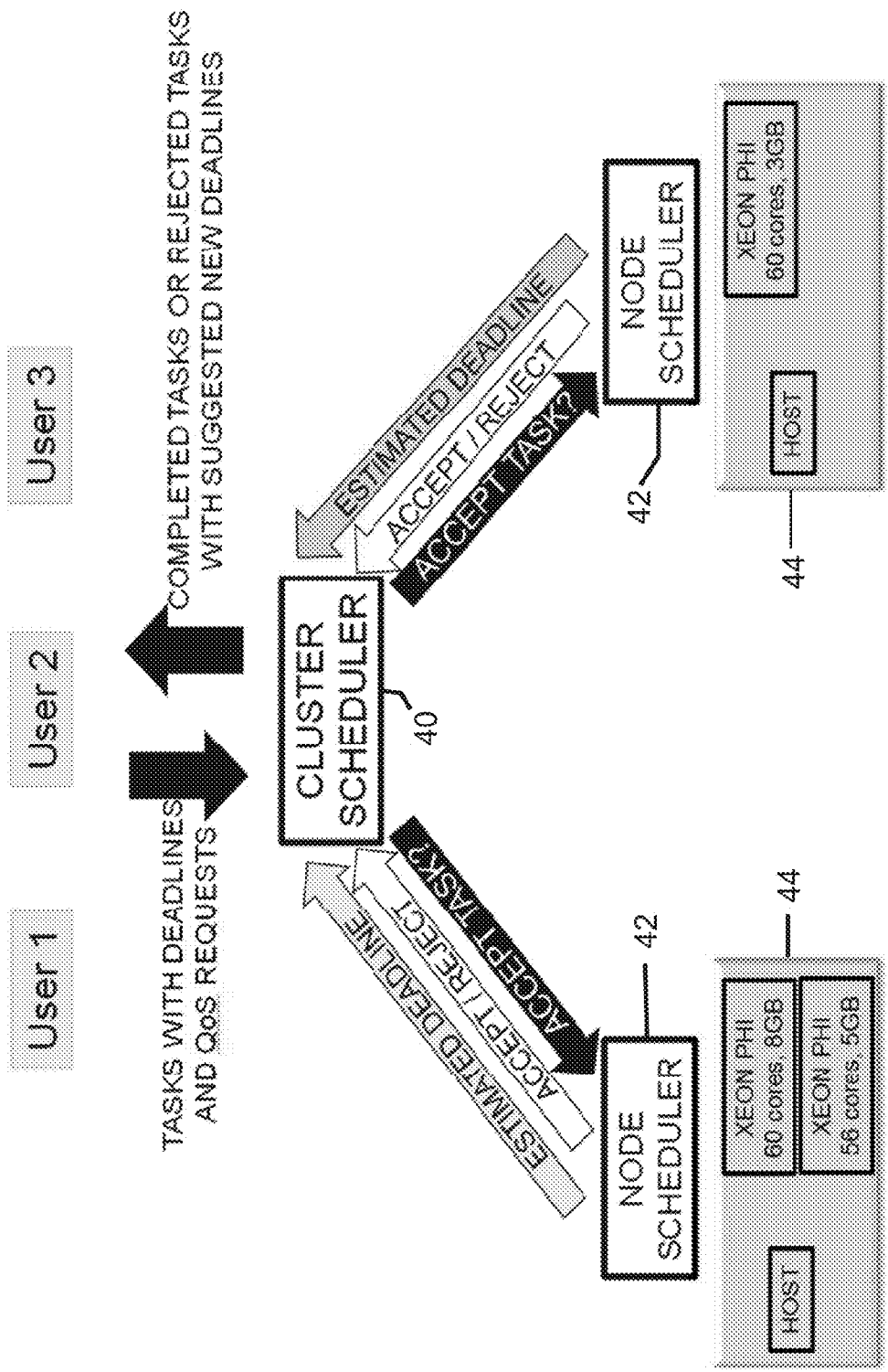
FIGS. 1B-1D show in more detail the process manager of FIG. 1A.
Figure 1C:
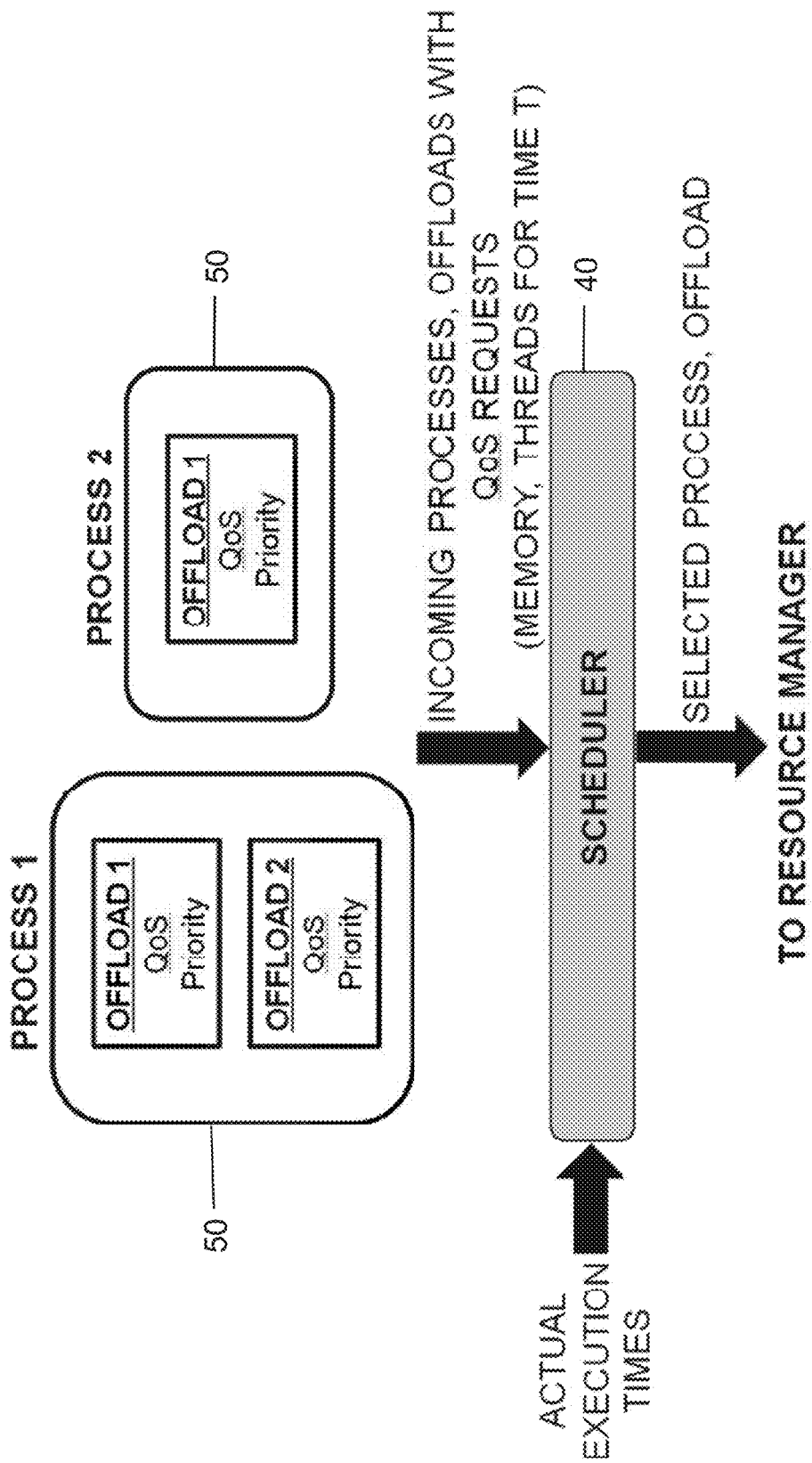
Figure 1D:
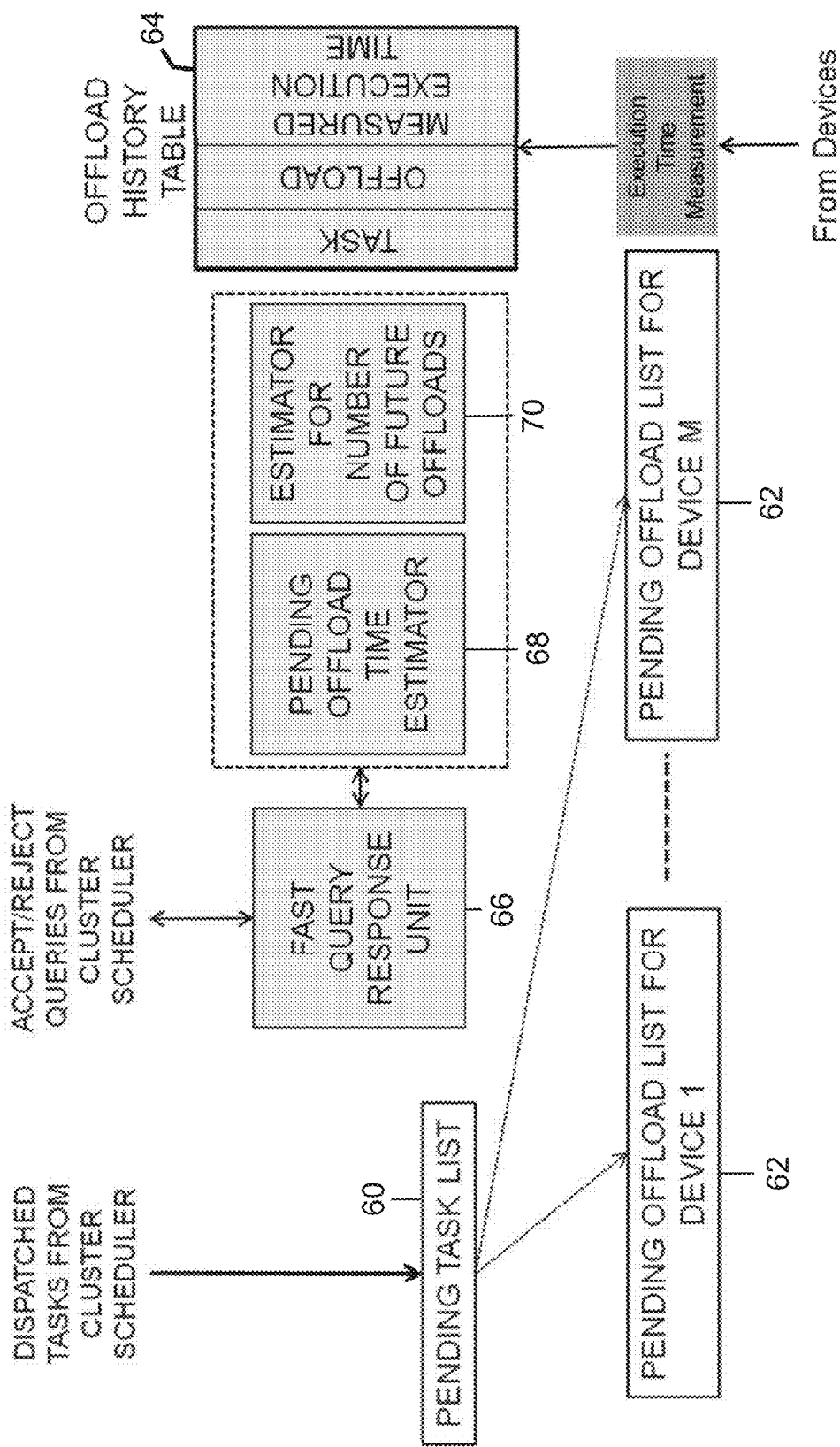

FIGS. 1B-1D show in more details the process manager of FIG. 1A. In FIG. 1B, a cluster scheduler 40 receives tasks with deadlines and quality of service (QoS) requests from users 1-3, for example. The cluster scheduler 40 communicates with one or more node schedulers 42, which control each host computer 44, each in turn having one or more multi core processor cards therein. The cluster scheduler 40 and node scheduler 42 communicates work requests and acceptance/rejection from the node scheduler 42 as well as the estimated deadline information. The cluster scheduler 40 in turn communicates completed tasks or rejected tasks with suggested new deadlines back to user processes.

The cluster scheduler 40 accepts tasks from users where each task specifies a deadline, and requests a certain total processing time, a specific number of Xeon Phi™ devices and peak memory on each device. Upon receiving a task, the cluster scheduler 40 sends queries to each node scheduler 42 to find out which nodes 44 can accept the task. The node schedulers 42 respond by indicating they can accept or reject the task. If they indicate they can accept the task, an estimated completion time along with a confidence level is provided. The cluster scheduler 40 uses this information to select a node 44 to which the task can be dispatched, or rejects the task and suggests a better deadline to the user so that the task can be resubmitted.

FIG. 1C shows in more details the processes 50, each with one or more offload requests with QoS and priority specification. The incoming requests are processed and based on actual execution times, the scheduler 40 selects the process 50 and offloads the process 50 to a resource manager for execution.

FIG. 1D shows in more details the node scheduler 42. Tasks dispatched from the cluster scheduler 40 enter a pending task list 60 which are distributed over a plurality of devices, numbered 1 to M. The execution time measurement information from devices 62 is provided to an offload history table 64, which stores information on tasks, offloads, and measured execution time. This information is used in estimators for pending offloads and number of future offloads. The estimator outputs are used by a fast query response unit 66 to accept or reject queries from the cluster scheduler 40.

FIG. 1D shows the main components of the node level scheduler 42. The node level scheduler 42 includes: (i) a list of pending tasks 60, (ii) a list of pending offloads 62 per Xeon Phi™ device, (iii) a processing time estimator 68 for pending offloads and (iv) an estimator 70 for the number of future offloads of a task. The estimators 68 and 70 rely on measuring offload execution times, and a history table 64 as shown in the figure. The estimators 68 and 70 are used in criticality-based scheduling for tasks and their offloads, as well as in providing a fast response to cluster scheduler queries.

Each task dispatched to the node 44 from the cluster scheduler 40 is added to the list of pending tasks 60. Once a task is scheduled, its offloads are added to the appropriate pending offload list 62 as they arrive.

When the cluster scheduler 40 provides the node with task parameters $<d_{ij}, x_{ij}, p_{ij}, m_{ij}>$ and queries if the task can be accepted, the node scheduler 42 first checks if it can satisfy the number of Xeon Phi™ cards requested, as well as the peak memory requested on each card. If not, the node indicates that it will reject the task if the task were to be dispatched to it. If resources are potentially available, the node scheduler 42 computes an estimated completion time for the task by examining all tasks currently executing, and all tasks in the pending task list. For each task in flight, it finds the processing time remaining by subtracting the time the task has already executed from the user-provided total processing time. For each task in the pending task list 60, it aggregates the user-provided processing times. The estimated completion time for task to is the sum of the remaining execution times for tasks in flight, the aggregated processing times for pending tasks, and the estimated processing time $p_{ij}$ of $t_{ij}$. For node n, the estimated completion time is therefore: $est_{ij}^n = t_{remaining} + t_{aggregated} + p_{ij}$.

The confidence level depends on the number of tasks. That is, if the node has a large number of pending or executing tasks, its confidence level will be low. If the node has no pending or executing tasks, its estimate will be more accurate and, hence, its confidence level will be higher. The confidence of a node n for estimating the completion time of a task $t_{ij}$ is given by: $conj_{ij}^n = 1/(1 + pending + executing)$.

A key distinction between the node scheduler 42 of the present embodiments and traditional operating system schedulers is that the present system concurrently schedules tasks and offloads. Coprocessors in the Xeon Phi™ server may have different memory and thread availabilities depending on ongoing multiprocessing. The node scheduler 42 not only takes into account these dynamically varying availabilities, but it also ensures fairness, i.e., it makes sure that all tasks and offloads eventually get access to coprocessor resources. The node scheduler 42 is event-based. A scheduling cycle is triggered by a new event that can be the arrival of a new task, the arrival of a new offload in an existing task, the dispatching of an offload to a Xeon Phi™ device, the completion of an offload or the completion of a task. It uses the concept of criticality, and selects at each scheduling cycle the most urgent task or offload from the list of pending tasks and offloads. As shown in FIG. 1D, at each new event, the node scheduler 42 examines the pending task list and the pending offload lists for each coprocessor. It selects a task or offload based on resource availability (the "fit" function) and criticality.

Figure 2:
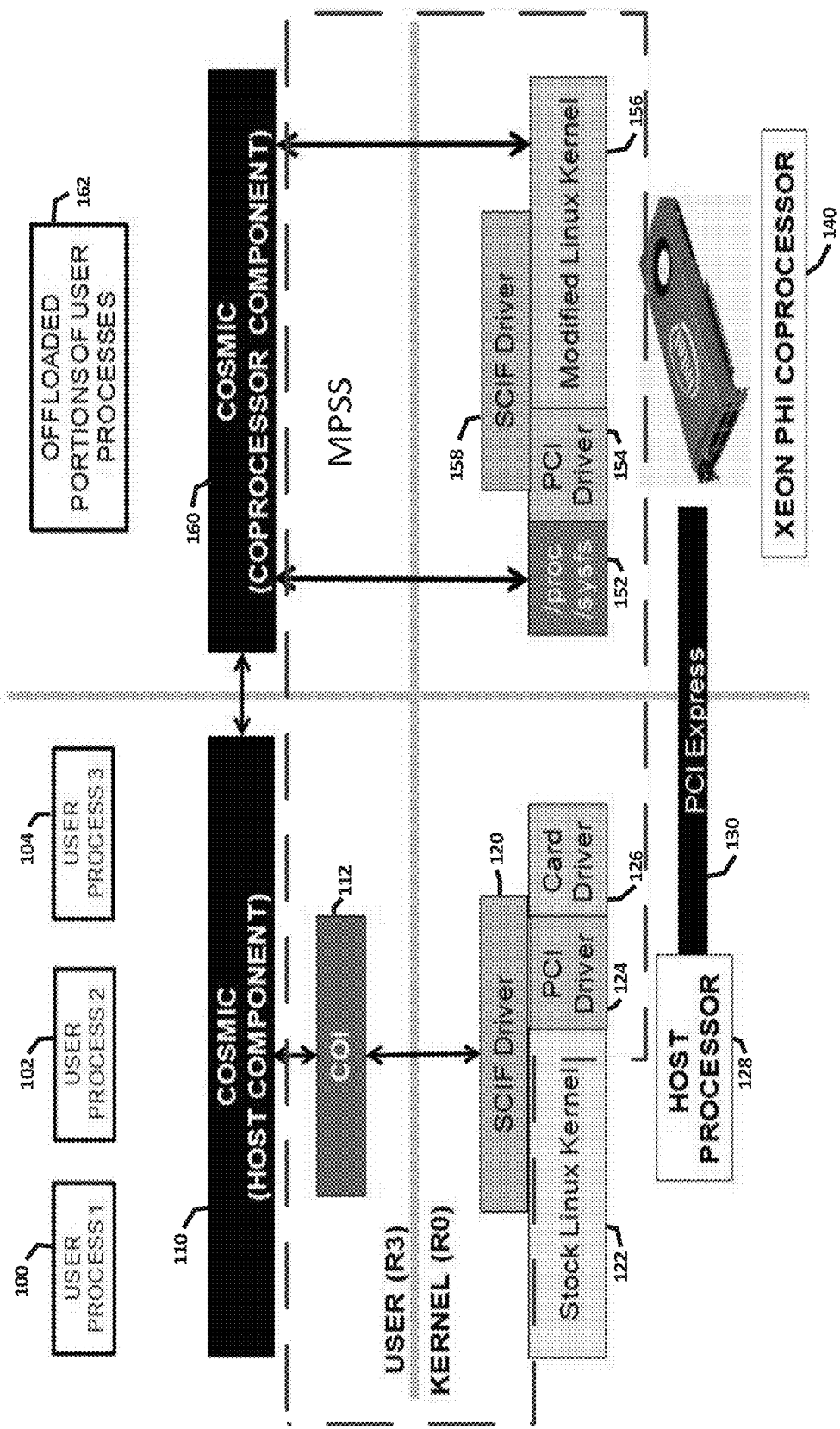
FIG. 2 shows an exemplary software stack with host and co-processor components of the multiprocessor software stack.

Referring now to FIG. 2, a block diagram of the Xeon Phi™ software stack and where COSMIC fits in is shown. The left half of the figure shows the stack on the host processor, while the right half shows the stack running on the coprocessor. The top half represents user space, and the bottom half represents kernel space. The host processor runs a Linux kernel 122 with a PCI and card driver 124-126 to communicate with the card. Along with the operating system, a Symmetric Communication Interface (SCIF) driver 120 is provided for inter-node communications. A node can be a Xeon Phi™ device 140 or the host processor 128. SCIF 120 provides a set of APIs for communication and abstracts the details of communicating over the PCIe bus 130. On top of SCIF 120, the Coprocessor Offload Infrastructure (COI) 112 is a higher-level framework providing a set of APIs to simplify development of applications using the offload model. COI provides APIs for loading and launching device code, asynchronous execution and data transfer between the host and Xeon Phi™ 140. The coprocessor portion of the software stack consists of a modified Linux kernel 156, the PCI driver 154 and the standard Linux proc file system 152 that can be used to query device state (for example, the load average). The coprocessor portion also has a SCIF driver 158 for communicating over the PCI bus with the host and other nodes. The COI 112 communicates with a COSMIC host component 110 that communicates with user processes 100-104. The host component 110 interacts with a COSMIC coprocessor component 160 that handles offloaded portions of user processes 162.

The COSMIC host middleware component has a global view of all processes and offloads emanating from the host, and knowledge of the states of all coprocessor devices. COSMIC is architected to be lightweight and completely transparent to users of the Xeon Phi system. As shown in FIG. 2, COSMIC exists in the user space, but interacts with both user processes and other kernel-level components. It controls offload scheduling and dispatch by intercepting COI API calls that are used to communicate with the device. This is a key mechanism of COSMIC that enables it to transparently gain control of how offloads are managed.

The Xeon Phi™ compiler converts all offload blocks that are marked by pragmas into COI calls. The user's program with offload pragmas is compiled using icc or a gcc cross-compiler for the Xeon Phi™. The compiler produces a host binary, and Xeon Phi™ binaries for all the offload portions. The offload portions are first translated into a series of COI API calls. The figure shows the important calls for a simple example: first COIEngineGetCount and COIEngineGetHandle get a handle to the coprocessor specified in the pragma. Then COIProcessCreateFromFile creates a process from the binary corresponding to the offload portions. Each offload block is represented as a function, and COIProcessGetFunctionHandles acquires the handles to these functions. COIPipelineCreate creates a "COI pipeline" which consists of 3 stages: one to send data to the coprocessor, one to perform the computation and one to get data back from the coprocessor. Then COIBufferCreate creates buffers necessary for inputs and outputs to the offload. In this example, three COI buffers corresponding to the arrays a, b and c are created. COIBufferCopy transfers data to the coprocessor, and COIPipelineRunFunction executes the function corresponding to the offload block. Finally, another COIBufferCopy gets results (i.e., array c) back from the Xeon Phi™.

In one embodiment, the offload request input is as follows:

```
#pragma offload target (mic:1)        \
    in(a: length(SIZE))               \
    in(b: length(SIZE))               \
    inout(c: length(SIZE))
    for (int i = 0; i < size; i++)
        c[i] = a[i] + b[i];
```

A cross compiler maps this request into the following exemplary requests:

```
/* get handle to coprocessor */
COIEngineGetCount(...);
COIEngineGetHandle(...);
/* create a process from the binary representing the offload block */
COIProcessCreateFromFile(...);
COIProcessGetFunctionHandles(...);
/* create a COI pipeline */
COIPipelineCreate(...);
/* create input buffers: a, b and c */
COIBufferCreate(...);
/* copy the buffers to the coprocessor */
COIBufferCopy(...);
/* run the function representing the offload region */
COIPipelineRunFunction(...);
/* copy results back */
COIBufferCopy(...);
/* clean up */
COIBufferDestroy(...);
COIProcessDestroy(...);
```

Since every offload is converted into a series of COI calls (which has a standard API), COSMIC can transparently control offload scheduling and dispatch.

COSMIC is architected as three components implemented as separate processes: the client, the scheduler, and the monitor, the latter comprising a host portion and a card-side portion, as depicted in FIG. 2. Inter-process interfaces are clearly defined: each process communicates with the other two using explicit messages.

The COSMIC client is responsible for intercepting COI calls and communicating with the COSMIC scheduler to request access to a coprocessor. It accomplishes this using library interposition. Every user process links with the Intel COI shared library that contains definitions for all API function modules. COSMIC intercepts and redefines every COI API function: the redefined COI functions perform COSMIC-specific tasks such as communicating with the COSMIC scheduler, and then finally calls the actual COI function. With the redefined functions, COSMIC creates its own shared library that is preloaded to the application (using either LD_PRELOAD or redefining LD_LIBRARY_PATH). The preloading ensures that COSMIC's library is first used to resolve any COI API function.

Based on the type of COI API intercepted, the client sends the following different messages to the scheduler:
  NewProcess: When an offload is first encountered for a process, the client sends a NewProcess message to the scheduler indicating that the scheduler should account for a new process in its bookkeeping. Every new process is annotated with its memory requirement provided by the user.
  NewOffload: For every offload, the client sends a NewOffload message to the scheduler indicating the process to which the offload belongs and the number of threads it is requesting. It also indicates the size of the buffers that need to be transferred to the coprocessor for this offload.
  OffloadComplete: When an offload completes, the client sends an OffloadComplete message to the scheduler so that it can account for the newly freed resources such as coprocessor cores and threads.
  ProcessComplete: When a process completes, the client sends a ProcessComplete message to the scheduler to account for the freed memory used by the process.

The COSMIC scheduler is the key actor in the COSMIC system and manages multiple user processes with offloads and several coprocessor devices by arbitrating access to coprocessor resources. It runs completely on the host and has global visibility into every coprocessor in the system. In scheduling offloads and allocating resources, it ensures no thread and memory oversubscription and load balances coprocessor cores and devices to most efficiently use them.

A key distinction between the COSMIC scheduler and traditional operating system schedulers is that COSMIC concurrently schedules processes and offloads within the processes. Each process has a memory requirement, while each offload has a thread requirement. Various coprocessors in the system may have different memory and thread availabilities.

Under these constraints, the goal of the scheduler is to schedule processes and offloads by mapping processes to Xeon Phi™ coprocessors and offloads to specific cores on the coprocessors. The scheduler also ensures fairness, i.e., makes sure all processes and offloads eventually get access to coprocessor resources.

The scheduler is event-based, i.e., a scheduling cycle is triggered by a new event. A new event can be the arrival of a new process, the arrival of a new offload in an existing process, the dispatching of an offload to a Xeon Phi™ device, the completion of an offload or the completion of a process. A queue of pending processes is maintained: each arriving new process is added to the tail of the pending process queue. A process is eventually scheduled to one Xeon Phi™ coprocessor. The scheduler also maintains a queue of pending offloads for each Xeon Phi™ coprocessor in the system. Each new offload is added to the tail of the offload queue belonging to the Xeon Phi™ coprocessor on which its process has been scheduled.

COSMIC has a client portion and a server portion. The client portion intercepts COI calls and communicates with the scheduler for coprocessor resources. It consists of a host process that links with the COI shared library, and it intercepts and redefines every COI API function. The redefined COI functions first perform COSMIC-specific tasks, such as communicating with the COSMIC scheduler, and then invoke the original COI function. For the redefined functions, COSMIC creates its own shared library that is pre-loaded (using either LD_PRELOAD or by redefining LD_LIBRARY_PATH). The preloading ensures that the redefined COI functions in COSMIC are used instead of the COI functions defined in the Intel® COI library. This is a fairly standard technique for interposing library calls, also referred to as API remoting.

Based on the intercepted COI call, the client sends different messages to the COSMIC scheduler:
  NewTask: Sent when the first offload of a COI process (task) is intercepted. The scheduler can now account for and keep track of the COI process and its coprocessor memory requirement.
  NewOffload: Sent when a new offload is intercepted. This message includes information about the COI process that the offload belongs to, the number of threads that the offload is requesting, and any affinity information.

OffloadComplete: Sent when an offload completes. This allows the scheduler to accurately account for recently freed resources such as coprocessor cores and threads.

TaskComplete: Sent when a task completes. This allows the scheduler to take into account the physical memory on the Xeon Phi that has now become available due to the completion of the COI process.

The COSMIC monitor collects data about the state of the coprocessors, and is the portion that measures execution times. It has a host-side component that communicates with several coprocessor-side components. The host-side component also communicates with the scheduler. The coprocessor-side components monitor the load on each coprocessor, the number of threads requested by each offload and the health (i.e. whether the COI process is alive or not) of each COI process.

In addition to COI API interception on the host, COSMIC also intercepts some programmer directives on the Xeon Phi™. The coprocessor component of the monitor does this. One embodiment intercepts omp_set_num_threads to determine the number of threads requested by each offload. Upon interception, the monitor blocks the offload, and communicates with the scheduler using these messages:

OffloadPause: Sent to inform the scheduler that the offload has been paused.

OffloadResume: Received from scheduler. The paused offload has been cleared to run with the new thread requirement.

To enable criticality-based scheduling, the monitor performs two additional functions:

When offloads complete, the monitor records the offload's execution time in the scheduler's history table.

The monitor also measures the time between an offload completion and the arrival of a new offload, which is the time the task spent on the host and must be counted towards the overall task processing time.

Figure 3:
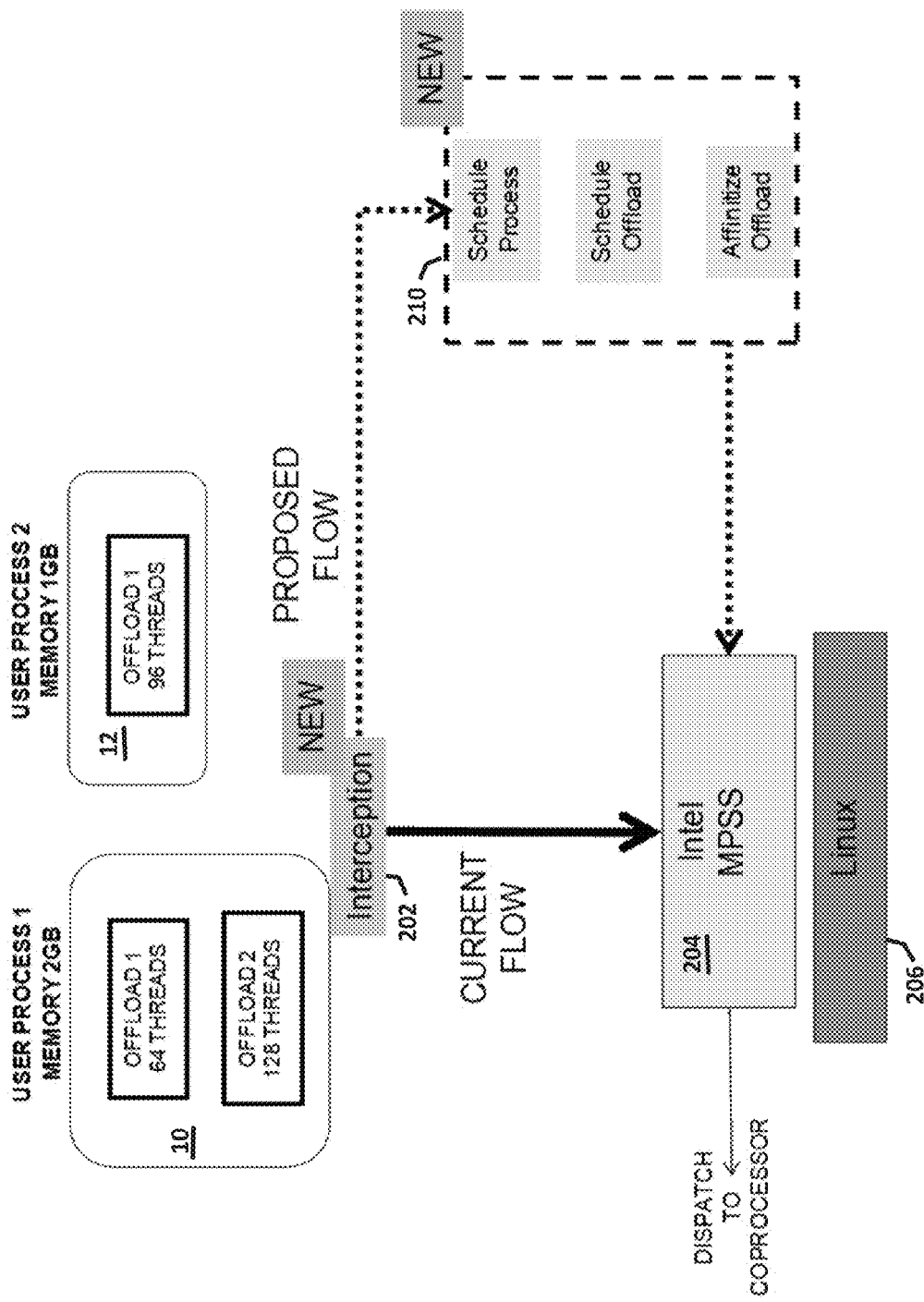
FIG. 3 shows an exemplary flow of the process manager of FIG. 1A.

Referring now to FIG. 3, workflow through the Xeon Phi™ software stack are shown when multiple processes are issued. They are all fed to the Xeon Phi™ manycore platform software stack (MPSS) runtime, which often serializes them in order to avoid crashing the coprocessor. The manager 20 avoids this by intercepting COI calls at 202, and the manager 20 takes control of the processes and offloads. Specifically, in 210 the manager 20 performs process scheduling, offloads scheduling and affinitizes offloads to specific cores on the co-processor. Once this is done, it issues the processes and offloads to the MPSS at 204 and continues with the Linux operating system 206.

Figure 4:
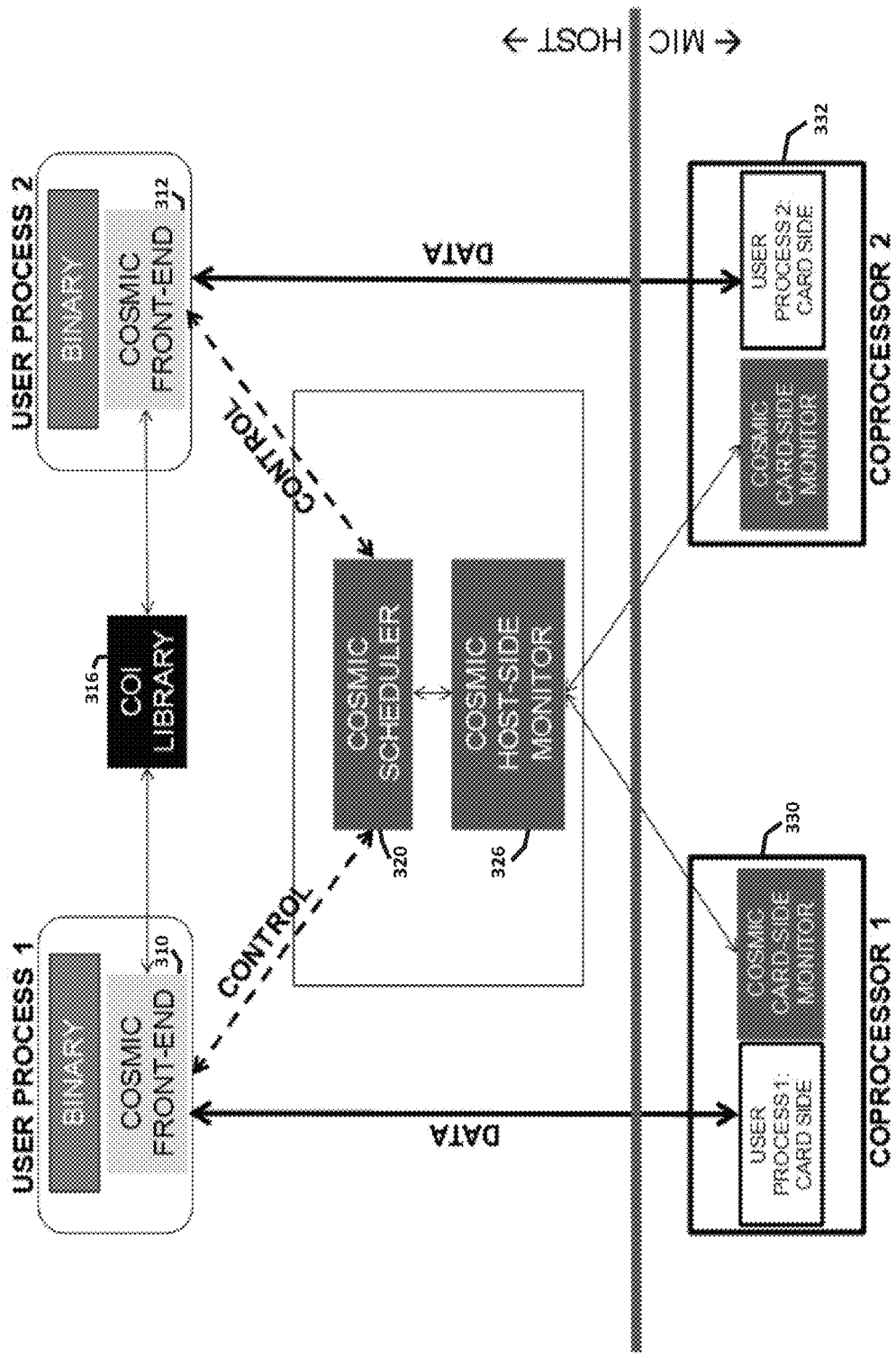
FIG. 4 shows an exemplary architecture of the process manager of FIG. 1A.

Referring now to FIG. 4, an exemplary architecture of the process manager of FIG. 1 is shown. COSMIC is architected as three components implemented as separate processes: front-ends or clients 310-312 that communicate with a library 316, scheduler 320 and monitor 326, the latter comprising a host portion and a card-side portion. Inter-process interfaces are clearly defined: each process communicates with the other two using explicit messages.

Referring now to FIG. 5A, an exemplary scheduling procedure for simultaneously scheduling processes and offloads is shown. The outer loop represents a scheduling cycle, which is initiated by a new event. A new event is triggered by the arrival or completion of processes or offloads at block 502. The scheduler maintains a single process list, and an offload list for each coprocessor device in block 504. When a new event occurs, criticality scores or "urgencies" for each element in the process list are updated in block 506 and the list is sorted based on those criticalities in block 508. A pending process is selected in block 510 and block 512 determines whether any coprocessor has enough free memory. Then offload queues corresponding to each coprocessor are examined by block 512, and the scheduler dispatches an offload to each coprocessor if it has enough free threads in block 514. Both processes and offloads are selected based on an aging-based first-fit heuristic. When a new event occurs, a pending process is selected and scheduled to a coprocessor that has enough free memory. Then offload queues corresponding to each coprocessor are examined, and the scheduler dispatches an offload to each coprocessor if it has enough free threads. Both processes and offloads are selected based on an aging-based first-fit heuristic. If a process is rejected due to no coprocessor having sufficient resources at the time, block 516 increments an "age" of the process and, if the age reaches a threshold, block 518 causes block 514 to schedule the process.

During each scheduling cycle, the scheduler examines the process list to select a process, and then examines each offload list in order to select one offload from each list. It selects at most one process from the process list and at most one offload from each offload list based on the following.

A Fit Function, which determines the eligibility of a process or offload, i.e., if the manycore processor has sufficient memory to satisfy a process' QoS, and sufficient memory and threads to satisfy an offload's QoS.

A Criticality (or "Urgency") function, which determines the best process or offload to schedule based on:

The process' or offload's priority;

The process' or offload's age, which depends on how many times the scheduler has examined the process or offload;

The amount of time the process or offload has been waiting to execute since it arrived;

The credits the process has. The credits owned by a process reflect its past behavior: if the offloads belonging to the process use lesser time than they requested on their resources, the process accumulates credits. If they use more time than requested, the process loses credits; and The process' or offload's QoS, i.e., the time the process or offload has requested resources for, and the number of resources requested.

After examining both process and offload lists, the scheduler adjusts credits in block. When an offload completes, as determined by block 520, its owning process in block 522 either gains or loses credits. If the offload uses less time than it requested, as determined by block 524, its owning process gains credits in block 526. Otherwise, credits are lost in block 526. Credits are used by the scheduler's criticality function, or may be adjusted against the user's accounts. The following psuedocode illustrates the use of credits:

```
while (new event) {
    if (there is a process to be scheduled) {
        /* Process scheduler: schedule a process from Process List */
        schedule(Process List,
            fit(Memory Resource Limit),
            criticality (priority, age, arrival time, credit, QoS));
    }
    for each Manycore Coprocessor {
        if (there is an offload to be scheduled) {
            /* Offload scheduler: schedule an offload from Offload List
            */
            schedule(Offload List,
                fit(Thread Resource Limit),
                criticality(priority, age, arrival time, credit, QoS));
        }
    }
    for each Completed Offload
        adjustCredits(owning process, actual execution time, QoS);
}
```

Figure 5B:
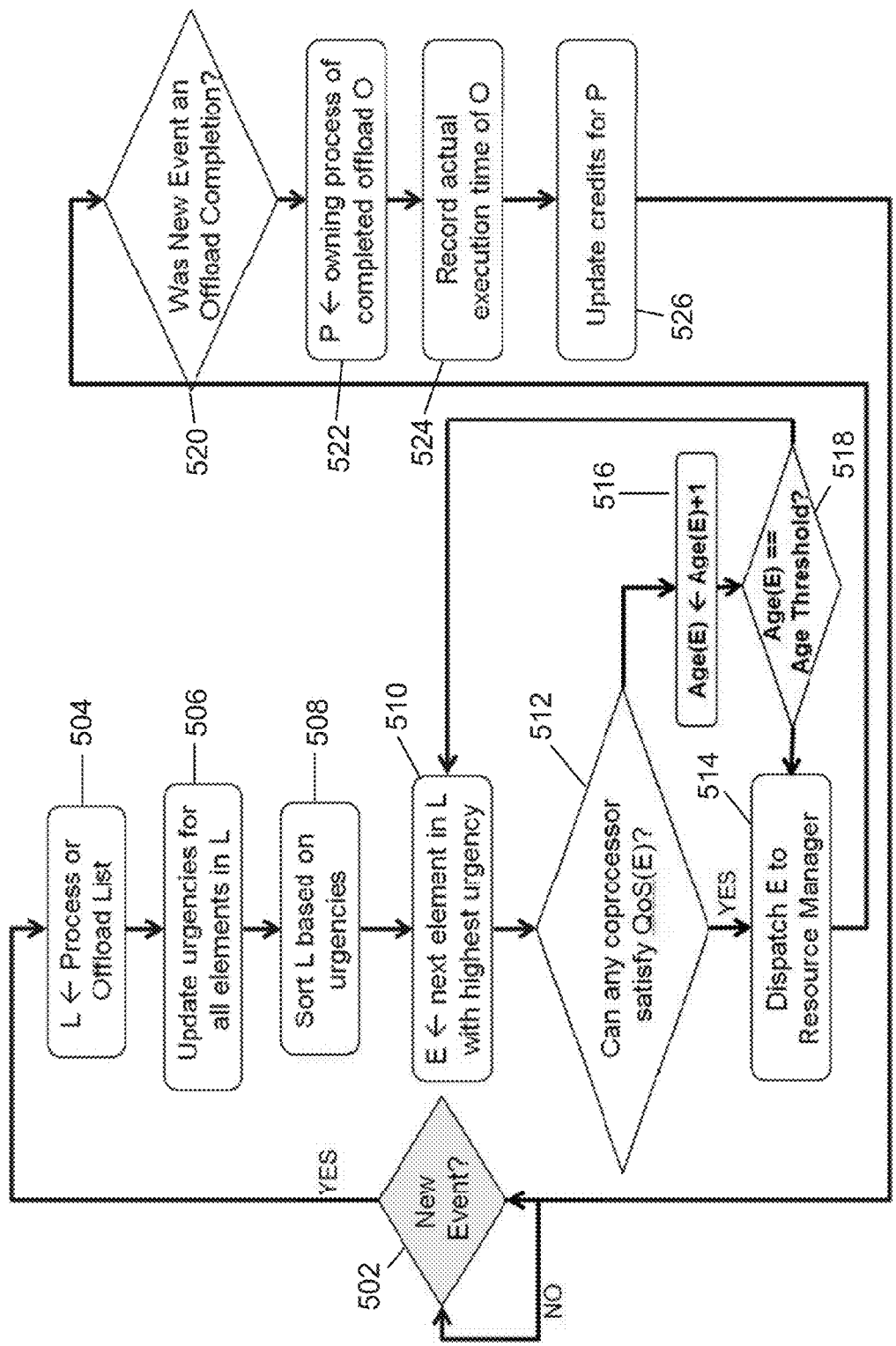

Referring now to FIG. 5B, the scheduling method is shown with a new event monitor which triggers the scheduling cycle. The basic scheduling method is the same for both processes and offloads. First, the method receives a process or offload list in block 528. Next, the method determines criticalities for all elements in the process or offload list, and sorts the list based on criticality (criticality is any function of priority, age, waiting time, QoS and credits). In block 530 it then picks the first element E with highest criticality whose resource request can be satisfied by a coprocessor in the server and checks for any coprocessor that can satisfy the QoS of E. To do this, it checks a device in a list of devices in block 532, determines whether the processor D has enough memory to complete the task in block 532, and continues down the list until either block 536 determines that all of the devices have been checked or until a processor is found with enough memory in block 534. If a device is found with sufficient memory, E is dispatched to the resource manager for further handling such as specific device and core allocation at block 538. If no device can provide resources for E at this time, the method increments the age of E at block 540 and, if the age reaches a pre-defined threshold in block 542, E is dispatched anyway to the resource manager in which will block the scheduling process until E successfully starts to execute.

If the new event is an offload completion, credits for the owning processes are updated based on how long the offload took to actually execute. The process records the actual execution time of O. If the offload requested resources for duration T, and took less than time T to actually run, the process gains credits since the offload did not use its allocated time (but presumably the user paid for it). If on the other hand, the offload took longer, credits are deducted from the owning process. Next, the process loops to process the next new event in block 530.

Figure 5C:
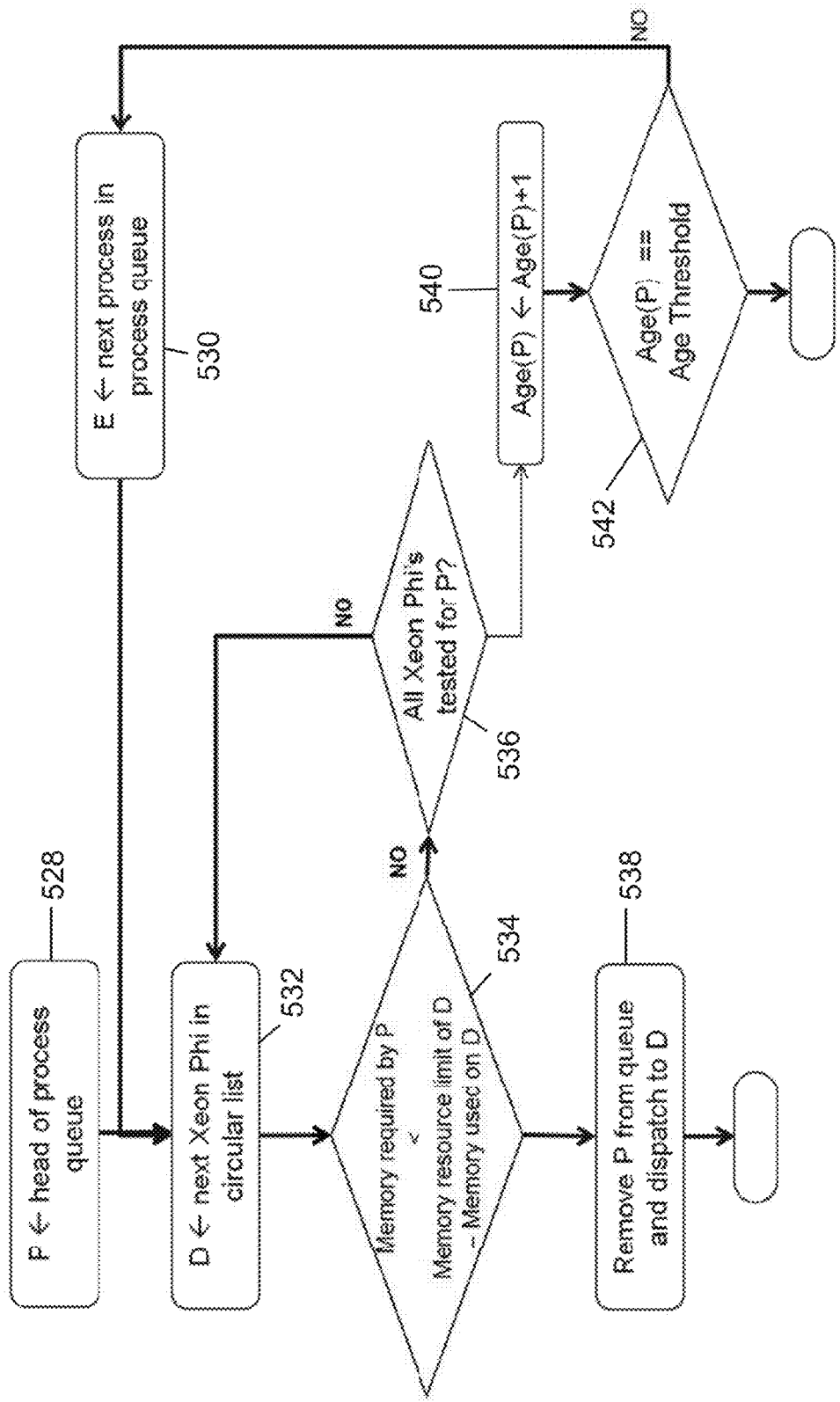
Figure 5D:
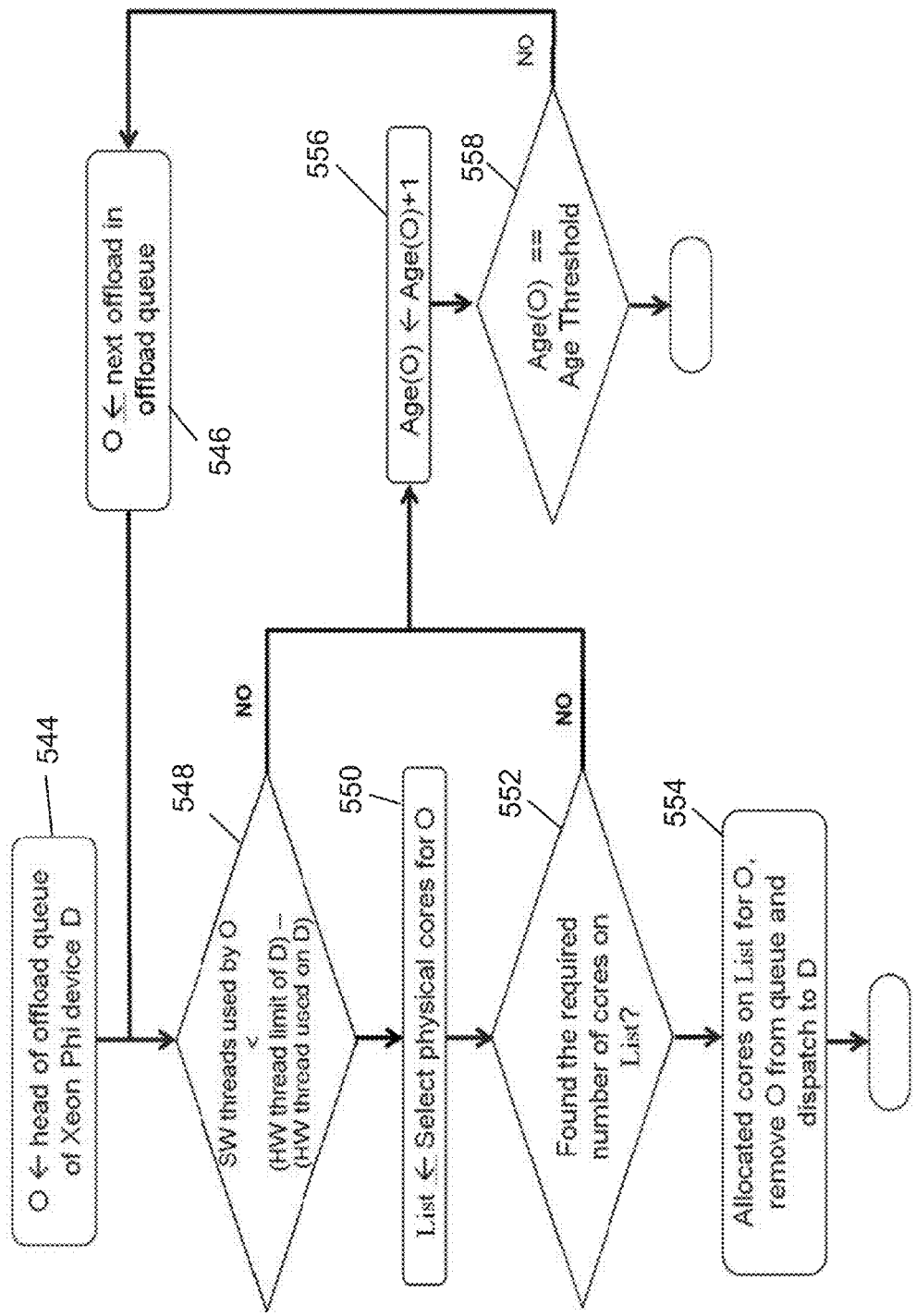

Referring now to FIG. 5D, an exemplary process is shown to select the offload queue based on the number of allocated cores. The cluster scheduler accepts or rejects tasks from users, and selects server nodes to which it dispatches accepted tasks. The $j^{th}$ task of $u_i$ is $t_{ij}$ and has deadline $d_{ij}$, requests an overall processing time $p_{ij}$ on the system having $x_{ij}$ Xeon Phi™ devices and required peak memory $m_{ij}$ on each device. The deadline and requirements of $t_{ij}$ are represented by the tuple $<d_{ij}, x_{ij}, p_{ij}, m_{ij}>$.

Block 544 receives an offload queue for a particular device, D. Block 546 selects the top offload from the queue. The offload is tested as to whether it can run on the device in block 548 by determining whether the number of software threads used by the offload is smaller than the number of available hardware threads on the device. If there are sufficient hardware threads available, block 550 checks a list of physical cores and block 552 determines whether a sufficient number of cores is available. If so, block 554 allocates the cores for the offload, removes the offload from the queue, and dispatches the task. If the device either lacks sufficient available hardware threads or physical cores, block 556 increments the age of the offload. If the age reaches a threshold age at block 558, processing ends. Otherwise, a new offload is selected in block 546.

The cluster scheduler 40 sends the deadline and requirements of each incoming task t to all server nodes. Each node responds by indicating it will either reject or accept the task if the cluster scheduler 40 were to decide to dispatch the task to it. Insufficient resources imply immediate rejection: server node n rejects the task if it does not have the required number of Xeon Phi™ devices, i.e, if $x_{ij} > M_n$. It also rejects the task if it does not have enough devices with the required memory $m_{ij}$. If both Xeon Phi™ devices and memory are available, the node n indicates it can accept the task with an estimated completion time $est_{ij}^n$ and confidence level $conf_{ij}^n$.

For each task $t_{ij}$, the cluster scheduler 40 collects responses from all server nodes. If every server node rejects the task, the cluster scheduler 40 rejects the task citing insufficient Xeon Phi™ device or memory resources.

Figure 5E:
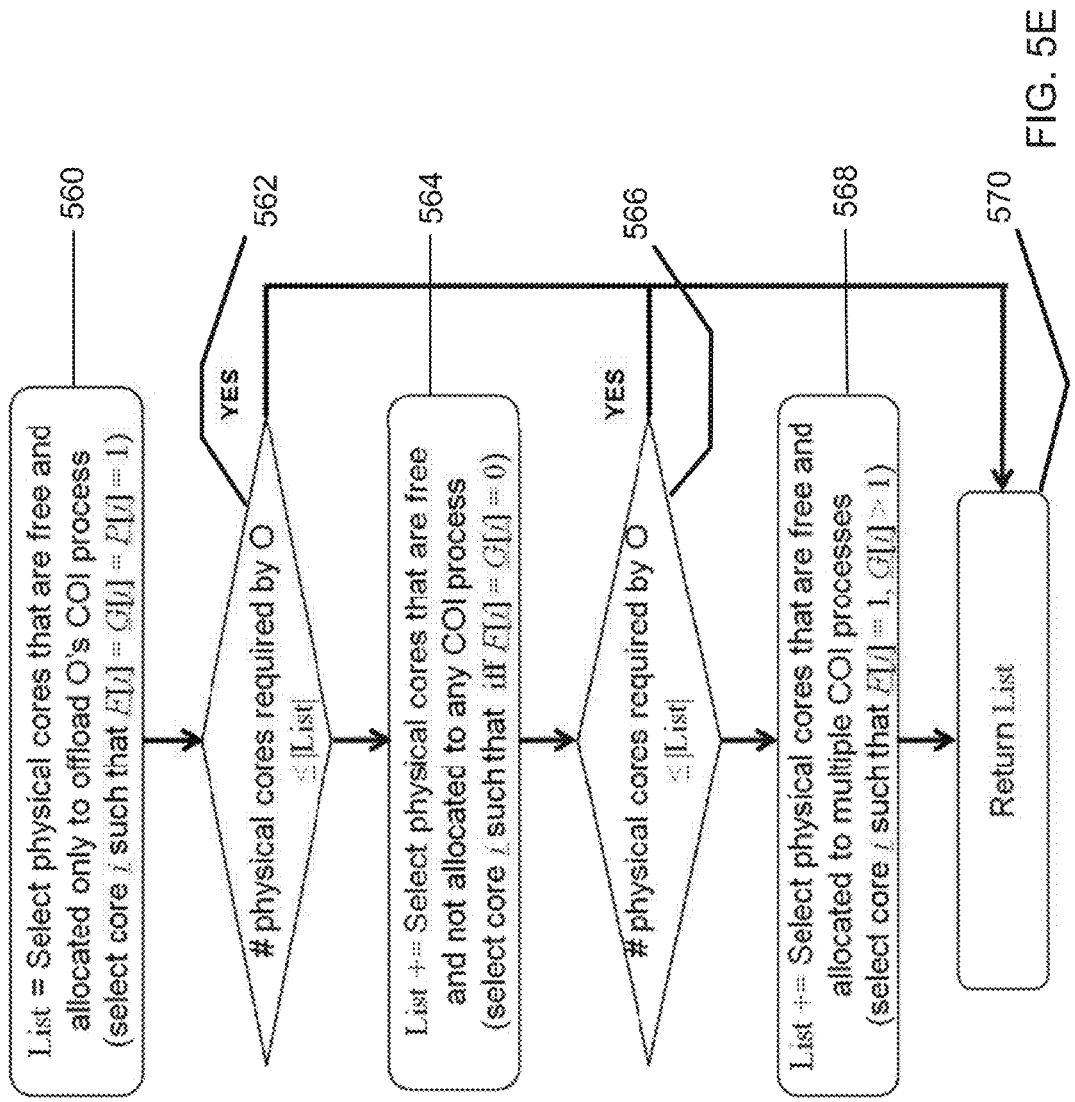

Referring now to FIG. 5E, a method for creating a list of physical cores is shown. Block 560 begins with a list of physical cores that are free and allocated to the offload task's COI process. Block 562 determines whether the number of physical cores required by the offload is smaller than the number of cores in the list. If so, the list is returned at block 570. If not, unallocated physical cores are added to the list in block 564. Block 566 checks again whether there are enough cores on the list to satisfy the offload. If so, the list is returned at block 570. If not, physical cores are added to the list that are allocated to multiple COI processes in block 568. The list is then returned in block 570.

Figure 5F:
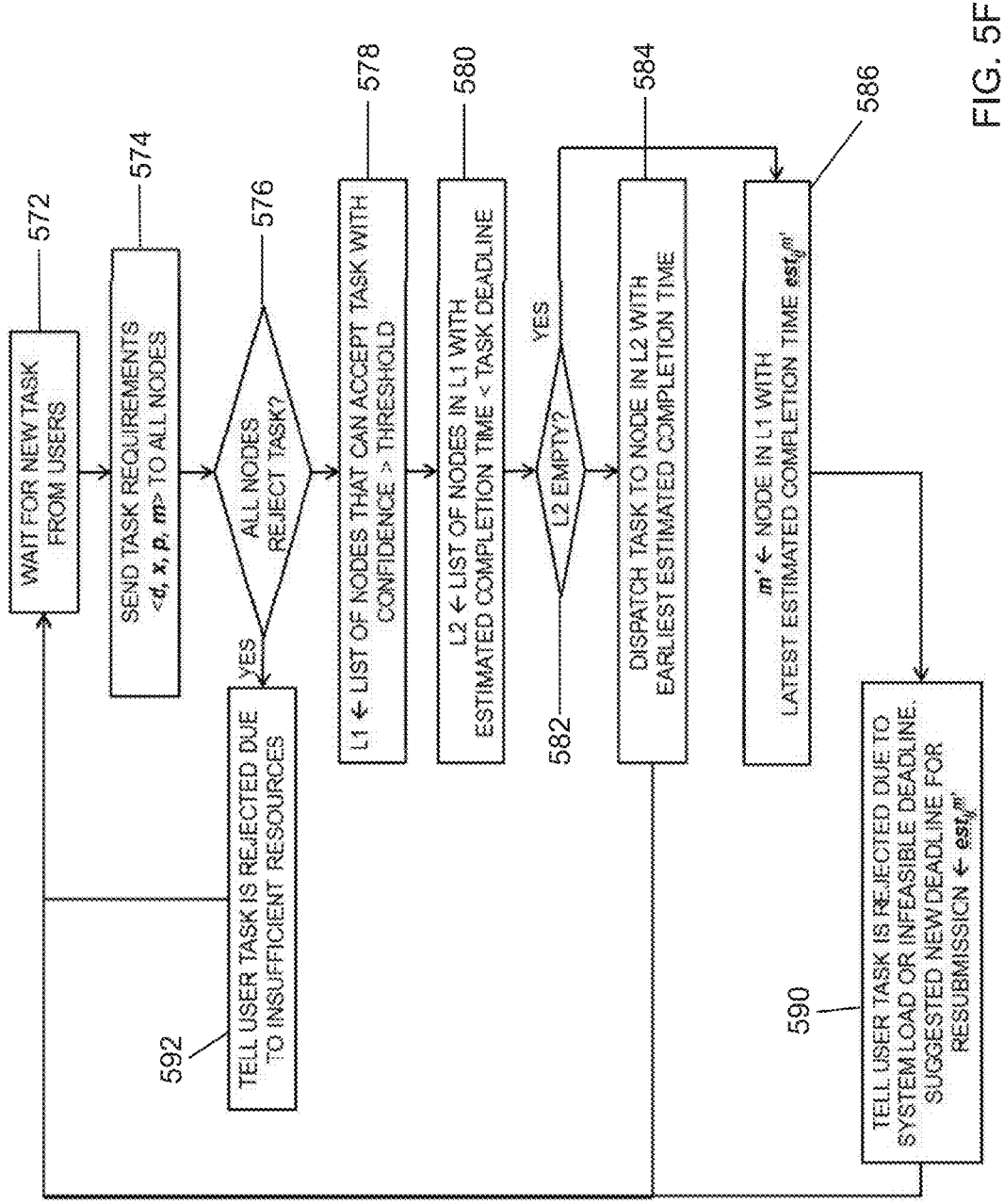

FIG. 5F shows the procedure for the cluster scheduler's node selection and task assignment procedures. Block 572 receives a new task from the user. Block 574 sends the task's requirements to all of the nodes. If, at block 576, all of the nodes reject the task, the user is informed at block 592 that the task has been rejected due to insufficient resources.

From among all nodes that accept the task, the cluster scheduler 40 obtains the subset of nodes L1 whose confidence level is above a cluster administrator-specified threshold at block 578. From L1, it obtains the set of nodes L2 whose estimated completion times are earlier than the task deadline at block 580. From among the nodes in L2, the task is assigned and dispatched to the node with the earliest estimated completion time at block 584. If no node meets the above criteria at block 582, the cluster scheduler selects the node m' whose confidence level is above the threshold and whose estimated completion time $est_{ij}^{m'}$ is the latest at block 586. It then rejects the task providing $est_{ij}^{m'}$ as the suggested new deadline if the user were to resubmit the task at block 590.

Credits are used to allow users flexibility and relax the accuracy with which processing times need to be specified. With the credit system, tasks that overrun their requested processing time slots are not killed, but allowed to complete. Instead such tasks use up credits of their users. Credits are used to offset slow running tasks with fast ones: a task that completes earlier than its requests processing time will gain credits for its user.

Figure 5G:
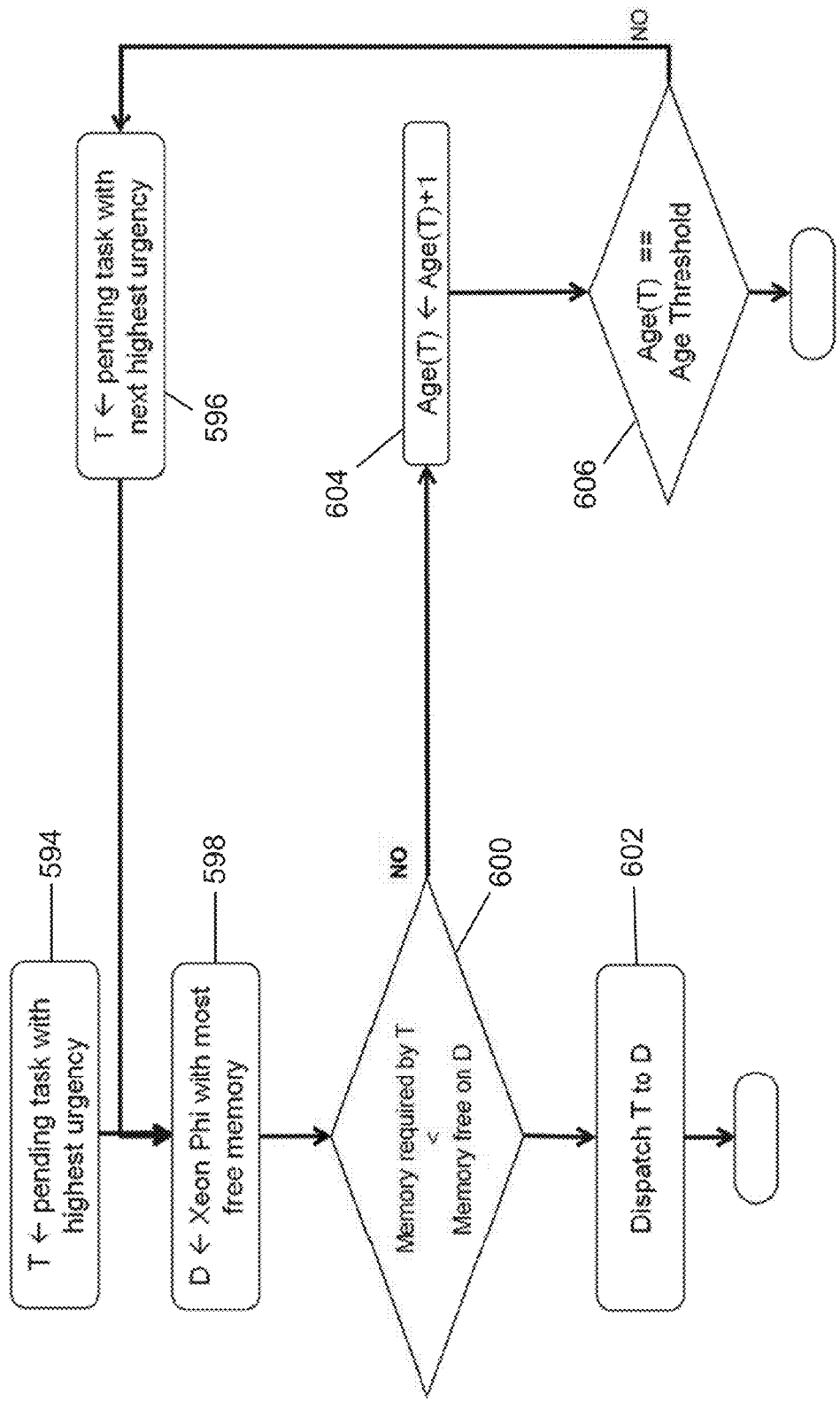

Referring now to FIG. 5G, the procedure for selecting a task is sown. The procedure for selecting an offload is very similar. A list of tasks, sorted by criticality or "urgency" is provided at block 594. The system first selects pending task T with the highest criticality or "urgency" at block 596. Then the system selects the Xeon Phi™ device ID with the most amount of free memory at block 598, and checks if that will suffice for the task at block 600. If sufficient memory is available, the task is dispatched at block 602.

If not, the task cannot be dispatched to any device, and the system increments its age at block 604. If the age reaches an administrator-specified threshold at block 606, the system blocks all scheduling until this task is scheduled. Otherwise, if the age is under the threshold, the system tries the task with the next highest criticality at block 596, and so on.

Figure 5H:
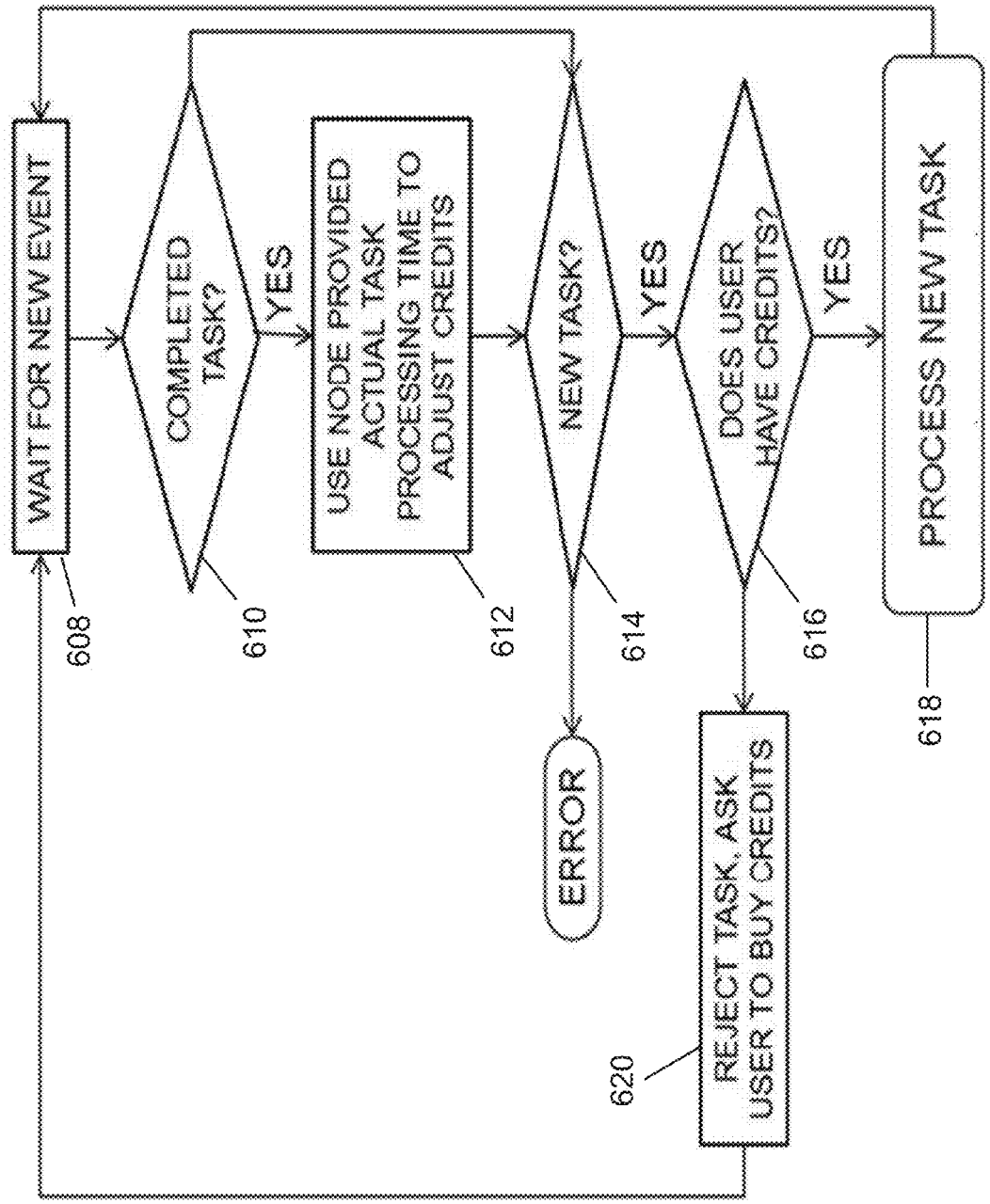

The cluster scheduler handles credits as shown in FIG. 5H. The cluster scheduler 40 waits for a new event at block 608, which must be a node completing a task $t_{ij}$, or a user issuing a new task. When a node completes a task as determined in block 610, it reports the actual processing time of the task $p\_act_{ij}$. If $p\_act_{ij}$ is smaller than the requested processing time $p_{ij}$, user acquires credits equal to the difference at block 612. Otherwise the user loses credits: $C_i$+=$p_{ij}$–p_act$_{ij}$.

The cluster scheduler adjusts user credits on every task completion. When a new task arrives at block 614, the cluster scheduler checks the task user's credits at block 616. If the credits are low or zero, the task is rejected until the user buys credits at block 620. Otherwise the task is processed at block 618.

The node level scheduler has two distinct functions. First, it receives task deadlines and requirements from the cluster level scheduler and either indicates it can accept or reject the task, providing an estimated completion time for tasks that it can potentially accept. Second, for tasks that have been assigned and dispatched to it by the cluster scheduler, the node scheduler must schedule both tasks and their offloads to Xeon Phi™ devices within the node.

Criticality of a task or offload is based on its slack, which is defined as the difference between the deadline and the expected completion time. Only pending tasks have slacks and criticalities. For a pending task $t_{ij}$, the slack is: slack$_{ij}$=d$_{ij}$–p$_{ij}$. Once a task is scheduled, its offloads can have slacks and criticalities. For the k$^{th}$ offload $o_{ijk}$ of task $t_{ij}$, the slack is slack$_{ijk}$=d$_{ijk}$–p$_{ijk}$, where d$_{ijk}$ is the deadline of offload $o_{ijk}$, and p$_{ijk}$ is the expected processing time of offload.

The criticality can be any appropriate function of the slack that increases as the slack decreases. In one embodiment, Criticality=–1*slack. In another embodiment, two functions used are:

$$\text{Criticality}=1/\text{MAX}(\text{slack},0)$$

$$\text{Criticality}=c1*e^{-c2*slack},$$

where c1 and c2 are empirically derived constants.

The node scheduler measures the execution time of each offload of every task and maintains them in a history table. To predict the processing time of the next offload of a task, a history-based method examines that the previous H offloads, where H is a configuration parameter specified by the cluster administrator. At the beginning when no historical information is available for a task, the offload's predicted processing time defaults to the task's processing time specified by the user. If the history has fewer than H entries, all available entries are used.

The current method uses simple linear interpolation of the task's previous offloads' measured times in order to predict the processing time of the task's next offload. The predicted processing time of $o^{ijk}$, the k$^{th}$ offload of task $t^{ij}$, is given by:

$$T\text{pred}_{ijk}=F(p_{ij(k-H)}, p_{ij(k-H-1)}, \ldots p_{ij(k-1)})$$

where $p_{ij(k-H)}$ represents the actual, measured processing time of the k-H$^{th}$ offload of task $t_{ij}$. F can simply average the last H measured offload processing times. Other forms of F such as weighted averaging and different extrapolation functions are possible as well.

In order to estimate a deadline for an offload, the system predicts the number of remaining offloads of a task and breakdown the user-provided task deadline uniformly into deadlines for each future offload. The number of remaining offloads is estimated using the user-provided task processing time $p_{ij}$, the time for which the task has run so far, and the predicted time of the next offload. Specifically, after offload k, the predicted number of remaining offloads for task $t_{ij}$, Npred$_{ij}$, is the difference between the user-provided processing time for the task and the measured execution time of the task so far, divided by the predicted time for the next offload:

$$N\text{pred}_{ij}=(p_{ij}-\text{execution time of } t_{ij} \text{ so far})/T\text{pred}_{ijk}$$

With the number of remaining offloads, the deadline for the next offload, $o_{ijk}$, is follows:

$$d_{ijk}=\text{current time}+(d_{ij}-\text{current time})/N\text{pred}_{ij}$$

TABLE 1

| Goal | Mechanism | Policy |
| --- | --- | --- |
| Avoiding memory oversubscription | Processes and offloads specify memory requirement through QoS. Use memory containers to enforce limit for processes. | The fit function considers M0 * (physical memory) as the total physical memory. If M0 > 1, memory is oversubscribed. |
| Avoiding thread oversubscription | Processes and offloads specify thread requirement through QoS. Schedule processes and offloads to control oversubscription. | The fit function considers T0 * (hardware threads) as total number of threads. If T0 > 1, the number of threads is oversubscribed. |
| Guarantee fairness | Age a process or offload every scheduling cycle if it cannot be dispatched. | When an age reaches a threshold, all scheduling is blocked until the aged process or offload is scheduled. |
| Respect priority | Allow processes and offloads to specify priority through QoS. | Incorporate priority in criticality function that decides which processes to schedule next. |
| Achieving QoS | List scheduling. Penalize processes or offloads that under-request time on resources. | Use criticality function to ensure processes or offloads that have been waiting are preferentially scheduled. |

Different mechanisms and policies are employed to achieve each of the goals of the present embodiments, as per Table 1. To achieve these goals, the present embodiments use the following components:

Simultaneous scheduling of processes and offloads;

Assignment of credits to processes based on runtime behavior of their offloads;

Assignment of ages to processes and offloads based on how many times they have been attempted to be scheduled;

Assignment of criticalities to processes and offloads based on priorities, waiting times, ages, requested QoS and credits; and Scheduling based on criticalities.

An aging-based first-fit procedure for process selection is shown in FIG. 5C. At the start of a scheduling cycle, let P be the process at the head of the pending process queue. The scheduler maintains a circular list of the Xeon Phi™ coprocessors in the system. Let D be the next coprocessor in the list. The scheduler checks to see if the memory required by P fits in the available memory of D. If it does, P is removed from the queue and dispatched to D. If not, the next coprocessor in the circular list is examined. If P does not fit in any coprocessor, its age is incremented, and the next pending process is examined. When a process' age reaches a threshold, all scheduling is blocked until that process is scheduled. This ensures fairness since all processes will get a chance at being scheduled.

Scheduling an offload is similar to scheduling a process, with one difference. Instead of memory, an offload has a thread requirement; COSMIC checks if the threads requested by an offload are available on the coprocessor on which the offload's owner process has been scheduled. If so, the offload is dispatched. If not, it increments the offload's age, and examines the next offload in the queue.

An administrator can specific the following parameters to tailor the scheduler's behavior: (i) aging threshold, (ii) thread over-scheduling factor and (iii) memory over-scheduling factor. The latter two indicate to what extent threads and memory may be oversubscribed.

The present embodiments thus enable:
Simultaneous scheduling of processes and offloads;
Assigning credits to a process based on how well its offloads adhere to the requested time (QoS) on their resources;
Using credits to prioritize a process;
Using credits against a user's account;
Assigning a criticality to a process an offload, where the criticality is a function of the process's or offload's age, priority, arrival time, credits and QoS;
Using criticality to prioritize a process or offload;
Aging a process and its offload;
Blocking scheduling depending on age; and
Allowing controlled memory and thread oversubscription using a configuration parameter.

COSMIC can be optionally configured to terminate any running process that uses more Xeon Phi™ memory than the amount specified by the user. COSMIC relies on Linux's memory resource controller to set up a memory container for each offload process on a Xeon Phi™ device. Each container limits the real committed memory usage of the offload process to the user-specified maximum value. If a process's memory footprint goes over the limit, the memory resource controller invokes Linux's out-of-memory killer (oom-killer) to terminate the offending process.

Enforcing this maximum memory usage rule requires an extra installation procedure and incurs minor runtime performance overhead. The memory resource controller is not enabled in the default Xeon Phi™ OS kernel. To install a new kernel with the memory resource controller requires adding one line to the kernel configuration file, recompiling the kernel, and rebooting Xeon Phi™ cards with the new kernel image. The runtime performance overhead due to using the Linux memory controller ranges from negligible to about 5% in real applications.

The scheduler in the framework allows multi-tasking where several tasks coexist and share each coprocessor. The cluster-level portion and a node-level portion handle the following:

Accept/Reject Query Phase: When a task with a deadline and resource requirements arrives at the cluster, the cluster scheduler send the task requirements to each node and queries if the node can accept the task. Nodes reject tasks if they do not have sufficient resources, but otherwise indicate they can accept the task with an estimated completion time and confidence level. The cluster scheduler then issues the task to a suitable node, or rejects the task if resources are insufficient or if it cannot complete the task within its deadline due to system load. When tasks are rejected due to system load, the framework provides the user with a more feasible deadline for possible resubmission.

Criticality-based Scheduling: The node-level scheduler schedules tasks and their offloads using a novel aging and criticality-based heuristic. Aging guarantees fairness, while criticality, which depends on deadlines and processing times, attempts to prioritize tasks and offloads so that maximal deadlines are met. Given a task deadline and processing time, the scheduler uses simple methods to estimate deadlines and processing times of subtasks offloaded to the Xeon Phi™ It allows different tasks and their offloads to coexist on a Xeon Phi™ device while providing performance isolation and resource guarantees.

Credits: The node-level scheduler uses a system of credits to relax the accuracy with which a user has to specify task processing times. A user accumulates credits if his or her tasks complete and free up resources faster than their requested processing times. Otherwise if tasks overrun their processing times, the user loses credits. A user can use credits gained from a fast task to offset a slow task. This allows some leeway in the specification of task processing times, which are often data dependent and not easy to specify accurately. Credits also help shift focus from the task-level to the userlevel: the important thing is not how well every single task adheres to its processing times, but rather how well a group of tasks belonging to a user together adhere to their collective processing time estimates.

An exemplary many integrated cores (MIC) co-processor is discussed next. The cores, PCIe Interface logic, and memory controllers are connected via an Interprocessor Network (IPN) ring, which can be thought of as independent bidirectional ring. The L2 caches are shown as slices per core, but can also be thought of as a fully coherent cache, with a total size equal to the sum of the slices. Information can be copied to each core that uses it to provide the fastest possible local access, or a single copy can be present for all cores to provide maximum cache capacity. In one embodiment, the coprocessor is the Intel® Xeon Phi™ coprocessor that can support up to 61 cores (making a 31 MB L2) cache) and 8 memory controllers with 2 channels each. Communication around the ring follows a Shortest Distance Algorithm (SDA). Co-resident with each core structure is a portion of a distributed tag directory. These tags are hashed to distribute workloads across the enabled cores. Physical addresses are also hashed to distribute memory accesses across the memory controllers. Each Xeon Phi™ core is dual-issue in-order, and includes 16 32-bit vector lanes. The performance of each core on sequential code is considerably slower than its multi-core counterpart. However, each core supports 4 hardware threads, resulting in good aggregate performance for highly parallelized and vectorized kernels. This makes the offload model, where sequential code runs on the host processor and parallelizable kernels are offloaded to the Xeon Phi™, a suitable programming model. The Xeon Phi™ software stack consists of a host portion and coprocessor portion. The host portion asynchronous execution and data transfer between the host and Xeon Phi™ The coprocessor portion of the software stack consists of a modified Linux kernel, drivers and the standard Linux proc file system that can be used to query device state (for example, the load average). The coprocessor portion also has a SCIF driver to communicate over the PCI bus with the host and other nodes. Together the current Xeon Phi™ software stack is referred to as the Many Integrated Core (MIC) Platform Software Stack or MPSS for short.

The present embodiments consider the interplay between the COSMIC system, described above, and a cluster job scheduler. In the present embodiments, the Condor scheduler is used, as it is a cluster job scheduler for compute-intensive jobs. Users submit their jobs to Condor, which places them in a queue and chooses when and where to run them based on policies. Condor provides a flexible framework for matching job resource requests with available resources. Condor's ClassAd mechanism allows each job to specify requirements (such as the amount of memory used) and preferences (such as a processor with more than 4 cores). It also allows cluster nodes to specify requirements and preferences about jobs they are willing to accept and run. Based on the ClassAds, Condor's matchmaking matches a pending job with an available machine.

A Condor pool comprises a single machine that serves as the central manager and all other cluster nodes. The central manager collects status information from all cluster nodes, and orchestrates matchmaking. To collect status information, it obtains ClassAd updates from each node. These updates include the state of the node such as currently available resources and load, and jobs that are executing on the node. The central manager then initiates a negotiation cycle during which all pending jobs are examined in FIFO order, and matched with machines. A negotiation cycle is triggered periodically or each time a new job is submitted. Once a match is made, a shadow process is started on the machine where the job was submitted, and a starter process on the target machine. The shadow process transfers the job and associated data files to the target machine, where the starter process spawns the user application. When the job completes, the starter process removes all processes spawned by the user job and frees any temporary scratch spaces, leaving the machine in a clean state.

In this section, we describe the proposed concepts, i.e., the new negotiation phase between the node and cluster schedulers and dynamic priority-driven job and offload scheduling. In the next section, we describe how we implement the concepts within Condor and COSMIC to build the system.

As noted above, the present embodiments include a cluster scheduler and a node scheduler. As shown in FIG. 1B, an overview of a cluster of two heterogeneous nodes consisting of different numbers and types of Xeon Phi coprocessors is shown. The cluster scheduler accepts jobs from users where each job specifies 3 requirements: total execution time, number of Xeon Phi™ devices and peak memory on each device. COSMIC already requires jobs specify the last two requirements.

A job is represented by $J_i$, where i is the job index. Job $J_i$ has the following requirements provided by the user:
Requested execution time: $e_i$
Requested number of Xeon Phi™ devices: $x_i$
Requested peak memory on each device: $m_i$ We represent the requirements of $J_i$ by $<e_i, x_i, m_i>$. Each job offloads subtasks to the Xeon Phi™, and the $j^{th}$ offloaded subtask of job $J_i$ is represented by $o_{ijk}$. N represents the number of servers in the cluster, where server node n has $M_n$ Xeon Phi™ devices. Xeon Phi™ device m in server node n has $mem_n^m$ bytes of total memory.

The cluster scheduler performs two distinct functions: job selection and node assignment. The scheduling is event based. A scheduling cycle, shown in pseudocode below, is triggered by a new event, which is either the arrival of a new job, the dispatching of a pending job or the expiration of an administrator-specified scheduling quantum (time limit).

```
while (new job arrived or
       job dispatched or
       job rejected or
       scheduling quantum expired) {
    /* job selection */
    compute dynamic priorities for all pending jobs;
    sort pending jobs based on decreasing priority;
    foreach pending job T {
        /* node assignment */
        N <- find best node for T;
        if (N) {
            dispatch T to N;
            break;
        }
    }
}
```

The first step in the scheduling cycle is to compute dynamic priorities for all pending jobs and sort the pending job list. Job $J_i$ is assigned a dynamic priority $P_i$ by the system based on its requested execution time $e_i$ and wait time so far $w_i$. Pi=wi−Ae$_i$, where A is a configuration parameter. A job's priority increases as its waiting time approaches A times its expected execution time. If A is zero, sorting based on dynamic priority is the same as sorting based on waiting time, that is, dynamic priority-driven scheduling degenerates to a first come first served (FCFS) policy. If, on the other hand, A is large, dynamic priority-driven scheduling is equivalent to shortest job first (SJF) since dynamic priority will depend overwhelmingly on job execution time. FCFS policies guarantee fairness to every job but do not optimize turnaround time or throughput. SJF attempts to reduce average turnaround time but is inherently unfair and does not prevent starvation. Dynamic priority allows us to trade-off fairness for turnaround time.

The next step is to assign a server node for the job $J_i$ with highest dynamic priority. The scheduler broadcasts $J_i$'s requirements to all nodes, and gets these responses from each:

Hard reject: If the job's device or memory requirements are impossible to satisfy, the node issues a "hard reject", i.e., node n hard rejects job $J_i$ if $x_i > M_n$ or if the node does not have enough devices with the required peak memory ($m_i < mem_n^m$ for fewer than $x_i$ devices).

Soft reject: If $J_i$'s requirements are not possible to satisfy at the current time due to other running jobs, the node issues a soft reject indicating it cannot accept the new job now but could accept it later once one or more running jobs complete.

Figure 6:
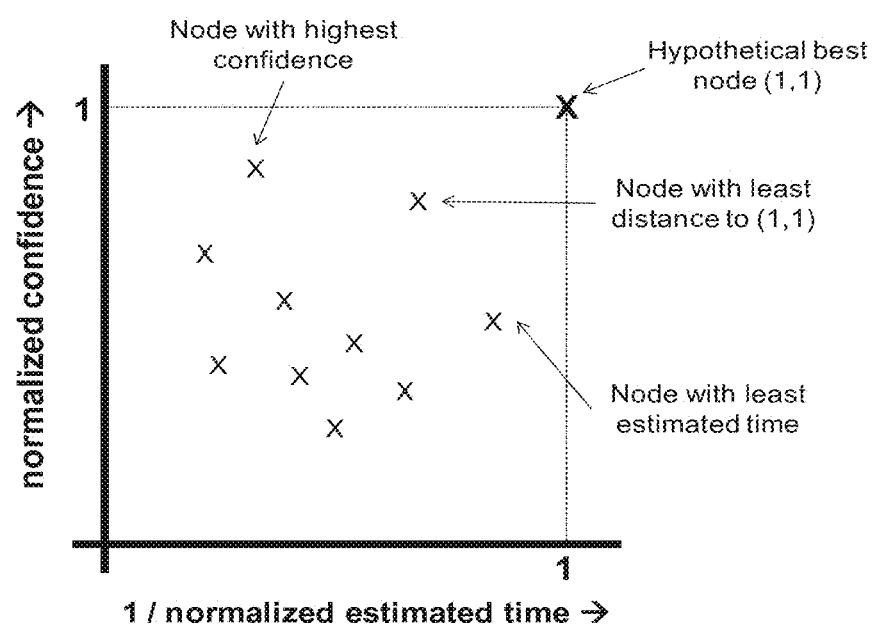
FIG. 6 shows an exemplary case of nodes having different estimated completion times and confidence values.

Confidence is a term that indicates how reliable the node's estimated time is. To select the best node, the confidence and estimated times of all nodes are normalized. All confidence values are normalized to the highest confidence and all estimated times are normalized to the lowest (fastest) estimated time. The hypothetical best node is the one with a normalized confidence of 1, and a normalized estimated time of 1. The heuristic to choose the best node is to find the node with the smallest distance to the hypothetical (1,1) coordinate. FIG. 6 shows an exemplary case of several nodes with different confidence values and estimated completion times. The figure plots the reciprocal of the normalized estimated completion time versus normalized confidence. The hypothetical best node is represented by the (1,1) coordinate. The figure shows the node with the highest confidence, and the node with the least estimated completion time. The node closest to (1,1) is chosen as the best node and assigned to the job.

Figure 7:
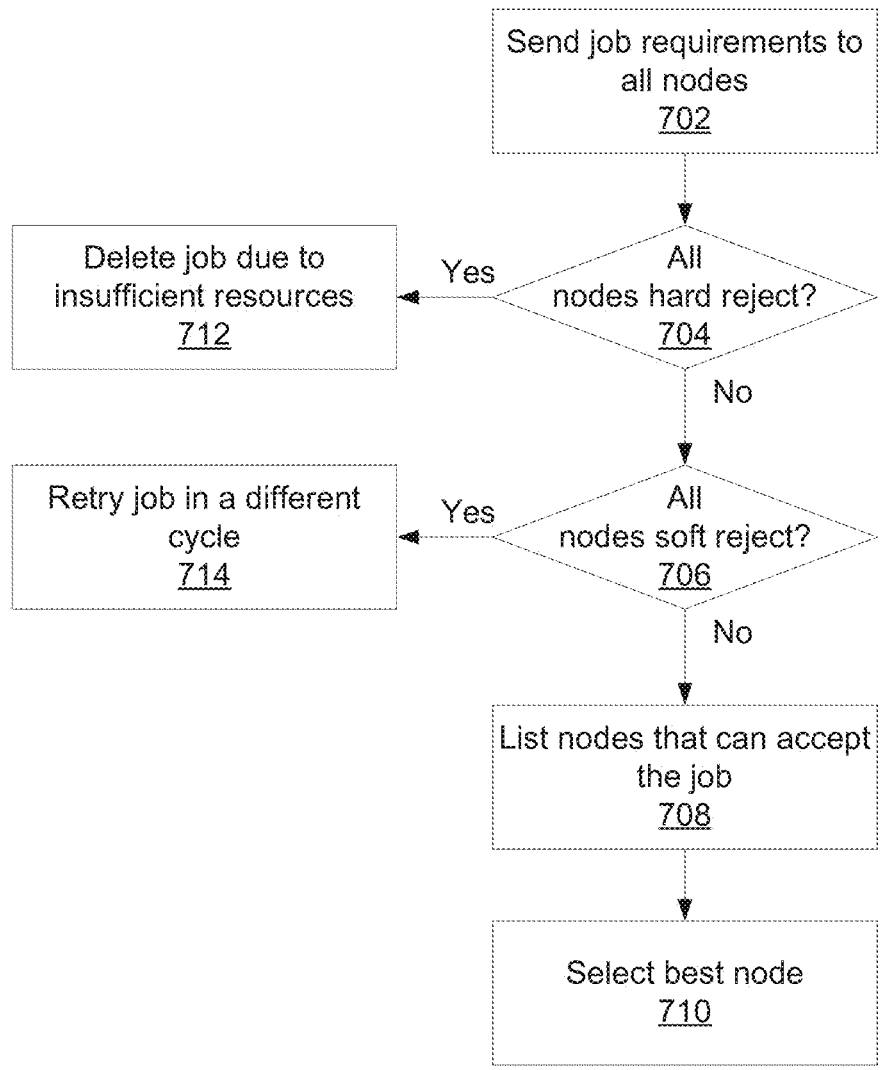
FIG. 7 shows a negotiation procedure in accordance with the present principles.
Figure 8:
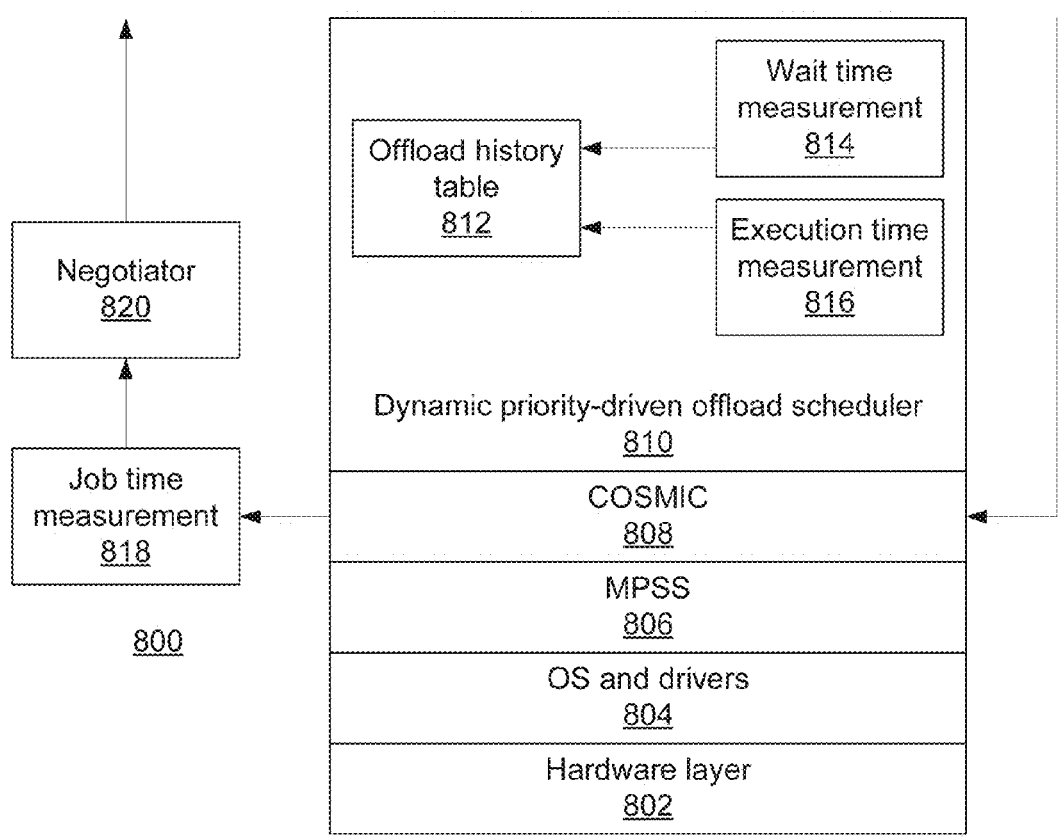
FIG. 8 shows a scheduling system in accordance with the present principles.

Referring now to FIG. 7, the negotiation procedure is shown in detail. Job requirements for a job are sent to all of the nodes in block 704. If all nodes reject (i.e., hard reject) the job in block 704, then block 712 deletes the job and the user informed. If all nodes soft reject in block 706, the job will be attempted in a future scheduling cycle according to block 714. From the set of all nodes that can accept the job (set L), listed in block 708, block 710 finds the node whose normalized confidence and reciprocal of normalized estimated time are closest to the (1,1) coordinate, and assigns the job to this node.

Referring now, a block diagram of a system embodying an offload scheduling system 800 is shown. The node scheduler of the present embodiments uses COSMIC, but augments it with two new aspects: the negotiation phase and dynamic priority-driven scheduling of offloads. A hardware layer 802 includes, e.g., a manycore processing architecture, such as Xeon Phi™, as well as a host processor and a suitable communications bus. An operating system layer 804 is contemplated as including Linux or any other suitable system with accompanying drivers suitable for accessing the hardware layer 802. The MPSS 806 runs jobs and offloads on the hardware layer 802 according to a schedule provided by COSMIC 808.

Cosmic 808 receives assigned jobs from a scheduler cluster and, based on a measurement of job completion time 818, uses a negotiator 820 to determine an estimated time of completion and confidence to provide back to the cluster scheduler. For offloads, COSMIC 808 communicates with a dynamic priority-driven offload scheduler 810, which creates an offload history table 812 based on wait time measurements 814 and execution time measurements 816.

In the negotiation phase, COSMIC 808 receives job requirements from the cluster scheduler and either indicates it can accept or reject the job, providing an estimated completion time with confidence for jobs that it can accept. Only jobs whose peak memory requirements fit in the node are accepted. For jobs that have been dispatched to it by the cluster scheduler, the node scheduler manages the scheduling of their offloads to Xeon Phi™ devices based on the offloads' dynamic priorities. By using the peak memory requirement of the job and monitoring the dynamically varying offload thread requirements, the COSMIC node scheduler 808 ensures no thread or memory oversubscription of the Xeon Phi™.

When the cluster scheduler sends Vs parameters $<e_i, x_i, m_i>$, the node scheduler 808 first checks if its absolute number of Xeon Phi™ cards and memory can satisfy job requirements. If not, it issues a hard reject indicating it can never accept this job. If resources are available but not free currently, the node issues a soft reject indicating that the job could potentially be accepted in a future scheduling cycle. Otherwise, the node scheduler indicates that the job will be accepted were the cluster scheduler to dispatch the job to this node.

The node scheduler 808 computes an estimated completion time and confidence for jobs it can accept. It does this by estimating when each currently running job will finish, and conservatively assumes the accepted job will be able to start and run to completion after all running jobs finish. For the $j^{th}$ running job $J_{rj}$, the estimated completion time $est_{rj}$ is calculated using the user-specified execution time $e_{rj}$, the time for which the job has already run $c_{rj}$, and the estimated waiting time for $J_{rj}$'s future Xeon Phi™ offloads.

For a node n, this estimated waiting time is given by:

$$est_{rj} = \text{current\_time} + e_{rj} - c_{rj} + \frac{e_{rj} - c_{rj}}{e_{rj}} w_{rj},$$

where $w_{rj}$ is the time for which the offloads of $t_{rj}$ that have either completed execution or are currently running had to wait thus far.

The estimated completion time of the queried job $J_i$ is the maximum of the estimated completion times of all running jobs, plus the requested execution time of $J_i$: $est_j = \text{MAX}_j est_{rj} + e_i$.

Along with the above estimated time, the node scheduler 808 provides a confidence level. The confidence level depends on how much of its execution each running job has completed. If the node has a large number of running jobs, or if its running jobs have only completed small portions of their executions, its estimations will likely be off, and hence its confidence is low. Similarly, if the node has no running jobs, it should have the highest confidence of 1. To get the confidence of node n for estimating the completion time of queried job $J_i$, the product of the completed portions of all running jobs on n is used:

$$conf_i^n = \begin{cases} \prod_j \frac{c_{rj}}{e_{rj}}, & \text{if running tasks exist} \\ 1, & \text{otherwise} \end{cases}$$

where $c_{rj}$ is the time for which job $J_{rj}$ has been running so far. COSMIC scheduler 808 is augmented with the ability to measure partial job completion time, indicated by job time measurement block 818.

After negotiation, the cluster scheduler dispatches the selected job to a node 800, which schedules the offloads of the job, along with offloads of its other running jobs. Dynamic priority-driven offload scheduling is event-based, shown in the pseudocode below.

```
while (new job arrived or
        new offload arrived or
        offload completed or
        job completed) {
    /* offload selection*/
    compute dynamic priorities for all pending offloads;
    sort pending offloads based on decreasing priority;
    foreach pending offload O {
        /* offload dispatch*/
        if (threads required by O < threads available) {
            dispatch O;
            break;
        }
    }
}
```

A scheduling cycle is triggered by a new event that can be the arrival of a new job, the arrival of a new offload within a running job, the completion of an offload or the completion of a job. The first step in a scheduling cycle is to compute dynamic priorities for all pending offloads, explained in detail below. Then the pending offload with highest dynamic priority whose thread requirements can be satisfied by the currently available free threads on the Xeon Phi™ is selected. Thread requirements are monitored by COSMIC 808 by intercepting calls such as omp_set_num_threads, and keeping track of the number of free threads on each device.

Dynamic priority of an offload is dealt with in a similar manner to a job's dynamic priority. For the $j_{th}$ offload $o_{ij}$ of job $J_i$, dynamic priority is: $P_{ij}=w_{ij}-Ae_{ij}$, where $w_{ij}$ is the time for which this offload has been waiting so far and $e_{ij}$ is the offload's expected execution time. The present embodiments add a module 814 in COSMIC 808 to measure offload wait times. Because only job execution times are available, offload execution times may be estimated by taking advantage of application characteristics in block 816.

Measured execution times for several past offloads are stored in the Offload History Table 812. To discover patterns in the offload times, the history table 812 is traversed and every offload is "binned" as follows. An offload $o_{ik}$, with execution time $e_{ik}$ is "binned" with an earlier offload $o_{ij}$ with execution time $e_{ij}$ if: (i) the difference between $e_{ik}$ and $e_{ij}$ is under 20% and (ii) among execution times for the offloads seen so far, $e_{ij}$ is closest to $e_{ik}$. Otherwise $o_{ik}$ creates its own bin. The 20% is empirically derived using the observed offload patterns for our workloads across several data sizes.

Once bins are created, the smallest repeating offload pattern is found and used to estimate the execution time of the next offload: the new offload is assumed to continue the repeating offload pattern and fit into an existing bin. Its execution time is estimated to be the average of all the offloads in its bin. If the history table does not have sufficient offloads, or if a repeating offload pattern cannot be found, the estimated execution time of the new offload is the average of all the offloads seen thus far. The estimated time of offload $o_{ij}$ of job $J_i$ is represented by $e_{ij}$.

Embodiments of the present invention may be used to augment any appropriate cluster-level scheduler as well. It is specifically contemplated that the Condor scheduler framework may be used, but it should be understood that any other appropriate framework may be used instead. The enhancements of the present embodiments may be implemented without changing the source code of the cluster scheduler.

Each processing core on the hardware layer 802 on a compute node 800 is represented as a slot that can be claimed to run a job. Only one job can run on one slot at a time. Each compute node obtains the number of Xeon Phi™ cards available as well as the card memory through, e.g., the Xeon Phi's™ micinfo utility, and advertises this in its ClassAd. Each job specifies its preferences for the number of Xeon Phi™ devices and memory in its job script.

The Condor negotiation cycle may be intercepted using standard library interposition. During the negotiation cycle, Condor selects a job, matches the job with nodes, and dispatches it. But once the negotiation cycle is intercepted, the present embodiments effectively pause the cycle and transfer control to the negotiator 820. At this time, the negotiator 820 obtains the list of pending jobs from Condor and sorts them based on dynamic priority. For each job, it negotiates with the augmented COSMIC 808 running on each cluster node 800 and selects the best node as described above. Using, e.g., the utility condor_qedit, the job's requirements are then changed by specifying the best node as the only node on which the job can run. Specifically, the "Requirement" field in the job script is changed and the selected node is assigned using "Name=<slotId>@<Node Name>". This forces Condor to subsequently dispatch the job to the selected node.

The system then waits for the Condor's next negotiation cycle, which is triggered when the Condor collector obtains the changed job requirements. To reduce overheads, the edited job requirements are submitted in a batch. That is, the entire list of pending jobs is processed and the new requirements are submitted together to the Condor collector.

Once a node 800 is selected for a job, resources on that node 800 are reserved for the job. If this were not done, the node would not account its resources accurately and would incorrectly respond during future negotiations in the same scheduling cycle. COSMIC 808 is enabled to receive a message from negotiator 820 to reserve resources for jobs that will be dispatched to it.

Embodiments of the present invention may be implemented in hardware, firmware or software, or a combination of the three. Preferably the embodiments are implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for scheduling jobs to manycore nodes in a cluster, comprising:
selecting a job to run according to the job's wait time and the job's expected execution time;
sending job requirements to all nodes in a cluster, wherein each node comprises a manycore processor;
determining at each node whether said node has sufficient resources to ever satisfy the job requirements and, if no node has sufficient resources, deleting the job;
creating a list of nodes that have sufficient free resources at a present time to satisfy the job requirements; and
assigning the job to a node using a processor, based on a difference between an expected execution time and associated confidence value for each node and a hypothetical fastest execution time and associated hypothetical maximum confidence value;

wherein selecting a job to run comprises ordering a list of pending jobs according to a priority based on a difference between a time each job has waited and a weighted expected execution time for each respective job; and wherein the priority $P_i$ of each job i is calculated according to $P_i = w_i - Ae_i$, where $w_i$ is the amount of time the job i has been waiting for scheduling, $e_i$ is the expected execution time for the job i, and A is a configuration parameter.

2. The method of claim 1, wherein the execution times and the confidence values of the nodes under consideration are normalized according to the hypothetical fastest execution time and the associated hypothetical maximum confidence value.

3. The method of claim 2, wherein the difference is measured as a distance from a point defined by the hypothetical fastest execution time and hypothetical maximum confidence value in a space defined on one axis by execution time and on a another axis by confidence value.

4. The method of claim 1, wherein said steps of selecting, sending, determining, creating, and assigning are performed each time a new job is added.

5. The method of claim 1, wherein the expected execution time for a job is estimated if the job is an offload to a manycore processor.

6. The method of claim 5, wherein the expected execution time is estimated by creating a set of bins based on historical execution time measurements and classifying the job according to one of the bins.

7. A system for scheduling jobs to manycore nodes in a cluster, comprising:
  a scheduler comprising a processor configured to select a job to run according to the job's wait time and the job's expected execution time, to determine whether any node has sufficient resources to ever satisfy job requirements associated with the job and, if no node has sufficient resources, to delete the job, to create a list of nodes that have sufficient free resources at a present time to satisfy the job requirements, and to assign the job to a node using a processor, said assignment being based on a difference between an expected execution time and associated confidence value for each node and a hypothetical fastest execution time and associated hypothetical maximum confidence value;

wherein selecting a job to run comprises ordering a list of pending jobs according to a priority based on a difference between a time each job has waited and a weighted expected execution time for each respective job; and wherein the priority $P_i$ of each job i is calculated according to $P_i = w_i - Ae_i$, where $w_i$ is the amount of time the job i has been waiting for scheduling, $e_i$ is the expected execution time for the job i, and A is a configuration parameter.

8. The system of claim 7, wherein the estimated execution times and the confidence values are normalized according to the hypothetical fastest execution time and the associated hypothetical maximum confidence value.

9. The system of claim 8, wherein the difference is measured as a distance from a point defined by the hypothetical fastest execution time and hypothetical maximum confidence value in a space defined on one axis by execution time and on a another axis by confidence value.

10. The system of claim 7, wherein the scheduler is configured to repeat a scheduling process each time a new job is added.

11. The system of claim 7, wherein the expected execution time for a job is estimated if the job is an offload to a manycore processor.

12. The system of claim 11, wherein the expected execution time is estimated by creating a set of bins based on historical execution time measurements and classifying the job according to one of the bins.

13. A non-transitory computer readable storage medium comprising a computer readable program for scheduling jobs to manycore nodes in a cluster, wherein the computer readable program when executed on a computer causes the computer to perform the steps of:
  selecting a job to run according to the job's wait time and the job's expected execution time;
  sending job requirements to all nodes in a cluster, wherein each node comprises a manycore processor;
  determining at each node whether said node has sufficient resources to ever satisfy the job requirements and, if no node has sufficient resources, deleting the job;
  creating a list of nodes that have sufficient free resources at a present time to satisfy the job requirements; and
  assigning the job to a node using a processor, based on a difference between an expected execution time and associated confidence value for each node and a hypothetical fastest execution time and associated hypothetical maximum confidence value;

wherein selecting a job to run comprises ordering a list of pending jobs according to a priority based on a difference between a time each job has waited and a weighted expected execution time for each respective job; and wherein the priority $P_i$ of each job i is calculated according to $P_i = w_i - Ae_i$, where $w_i$ is the amount of time the job i has been waiting for scheduling, $e_i$ is the expected execution time for the job i, and A is a configuration parameter.

* * * * *